(12) United States Patent
Kawakami et al.

(10) Patent No.: US 7,270,795 B2
(45) Date of Patent: Sep. 18, 2007

(54) METHOD FOR PRODUCING NANO-CARBON MATERIALS

(75) Inventors: Soichiro Kawakami, Nara (JP); Katsuhiko Inoue, Kyoto (JP); Hitomi Sano, Kyoto (JP); Nobuyuki Suzuki, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 10/762,343

(22) Filed: Jan. 23, 2004

(65) Prior Publication Data

US 2005/0079119 A1    Apr. 14, 2005

(30) Foreign Application Priority Data

Jan. 23, 2003    (JP)    ............................. 2003-014212

(51) Int. Cl.
*D01F 9/12*    (2006.01)
(52) U.S. Cl. .................................... 423/447.1; 977/842
(58) Field of Classification Search ............. 423/447.1; 977/842
See application file for complete search history.

(56) References Cited

U.S. PATENT DOCUMENTS

| | | | |
|---|---|---|---|
| 3,030,187 A | 4/1962 | Eversole | 23/209.4 |
| 3,030,188 A | 4/1962 | Eversole | 23/209.4 |
| 6,113,819 A | 9/2000 | Tennent et al. | 264/29.6 |
| 6,455,021 B1 | 9/2002 | Saito | 423/447.3 |
| 7,001,581 B2 | 2/2006 | Kawakami et al. | 423/447.3 |
| 2002/0102193 A1 | 8/2002 | Smalley et al. | 422/190 |
| 2002/0102194 A1 | 8/2002 | Smalley et al. | 422/190 |
| 2002/0102203 A1 | 8/2002 | Smalley et al. | 423/447.3 |
| 2003/0072706 A1 | 4/2003 | Kawakami et al. | 423/445 R |
| 2003/0086859 A1 | 5/2003 | Kawakami et al. | 423/447.1 |
| 2006/0062713 A1 | 3/2006 | Sano et al. | 423/455 R |
| 2006/0171873 A1 | 8/2006 | Inoue | |

FOREIGN PATENT DOCUMENTS

| | | |
|---|---|---|
| EP | 1 300 363 A2 | 4/2003 |
| EP | 1 300 364 A2 | 4/2003 |
| JP | 5-186865 | 7/1993 |
| JP | 6-32606 | 2/1994 |
| JP | 6-56414 | 3/1994 |
| JP | 6-157016 | 6/1994 |

(Continued)

OTHER PUBLICATIONS

Shao, et al., Benzene-thermal route to carbon nanotubes at a moderate temperature, Carbon 40 (2000) 2961-2973.*

(Continued)

*Primary Examiner*—Edward M. Johnson
*Assistant Examiner*—Daniel C. McCracken
(74) *Attorney, Agent, or Firm*—Fitzpatrick, Cella, Harper & Scinto

(57) ABSTRACT

A method for producing nano-carbon materials, having a step wherein a starting material comprising one or more kinds of compounds selected from the group consisting saturated hydrocarbons, unsaturated hydrocarbons, saturated cyclic hydrocarbons, and alcohols whose atomic ratio of the component carbon to the component oxygen is more than 2.0 and a catalyst are together treated at a temperature in a range of from 100 to 800° C. while being compressed at a pressure in a range of from 0.2 to 60 MPa.

25 Claims, 16 Drawing Sheets

FOREIGN PATENT DOCUMENTS

| | | |
|---|---|---|
| JP | 9-188509 | 7/1997 |
| JP | 10-273308 | 10/1998 |
| JP | 2000-86217 | 3/2000 |
| JP | 2000-95009 | 4/2000 |
| WO | WO 01/10779 A1 | 2/2001 |
| WO | WO 02/079082 A2 | 10/2002 |
| WO | WO 2004/007361 A2 | 1/2004 |
| WO | WO 2004/089820 A1 | 10/2004 |

OTHER PUBLICATIONS

Yury G. Gogotsi et al., "Formation of Filamentous Carbon from Paraformaldehyde Under High Temperatures and Pressures," 36(7-8) *Carbon* 937-42 (1998).

Yury G. Gogotsi et al., "Hydrothermal Synthesis of Multiwall Carbon Nanotubes," 15(12) *J. Mater. Res.* 2591-2594 (Dec. 2000).

Jose Maria Calderon Moreno et al., " Hydrothermal Processing of High-Quality Multiwall Nanotubes from Amorphous Carbon," 123 *J. Am. Chem. Soc.* 741-42 (2001).

Mingwang Shao et al., "Benzene-Thermal Route to Carbon Nanotubes at a Moderate Temperature," 4 *Carbon* 2961-73 (2000).

"Kogyo Zario (Industrial Materials)", vol. 51, No. 1, pp. 38-41 (2003).

Selichiro Matsumoto et al., "Vapor Deposition of Diamond Particles from Methane," 21(4) *Jap. J. Appl. Phys.* L183-L185 (Apr. 1982).

F.P. Bundy et al., "Man-Made Diamonds," 176 *Nature* 51-55 (Jul. 1955).

B.V. Spitsyn et al., "Vapor Growth of Diamond on Diamond and Other Surfaces," 52 *J. Cryst. Growth* 219-26 (1981).

\* cited by examiner

F I G. 1
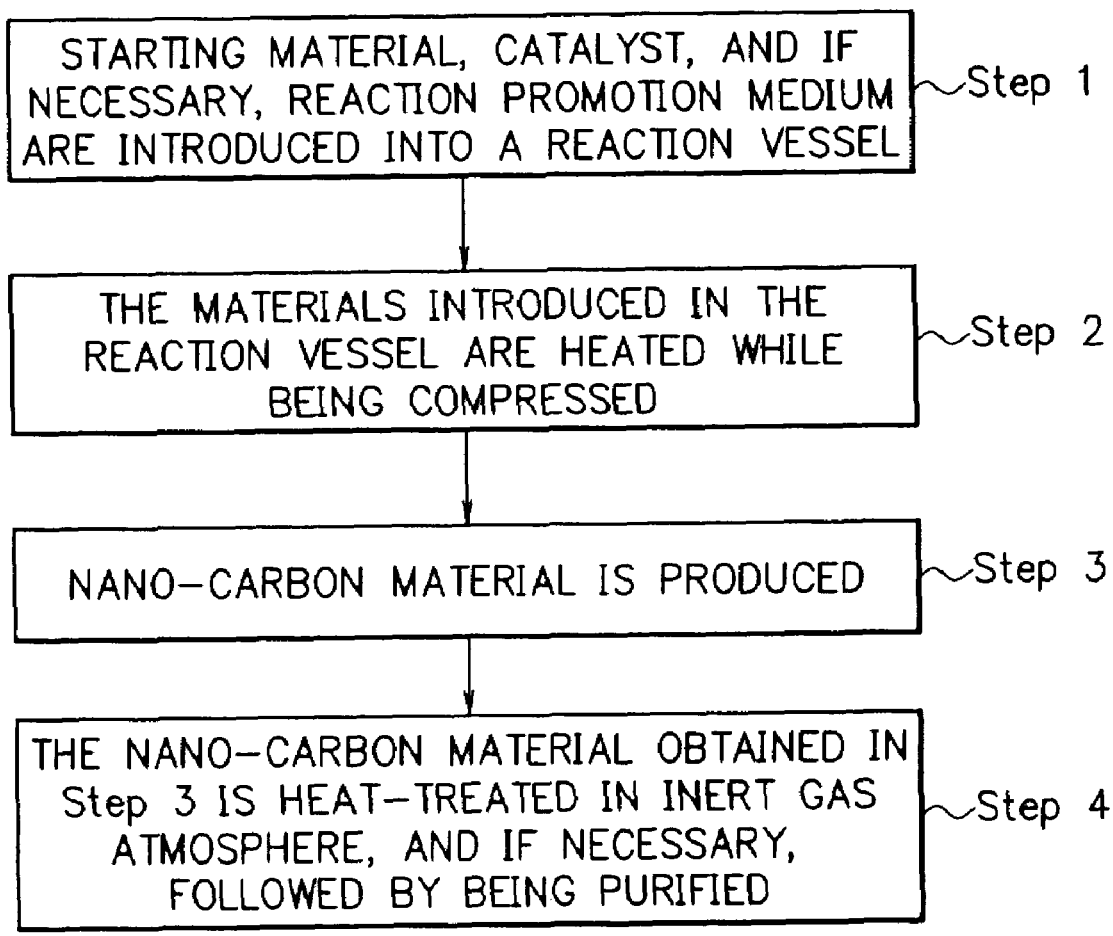

F I G. 2
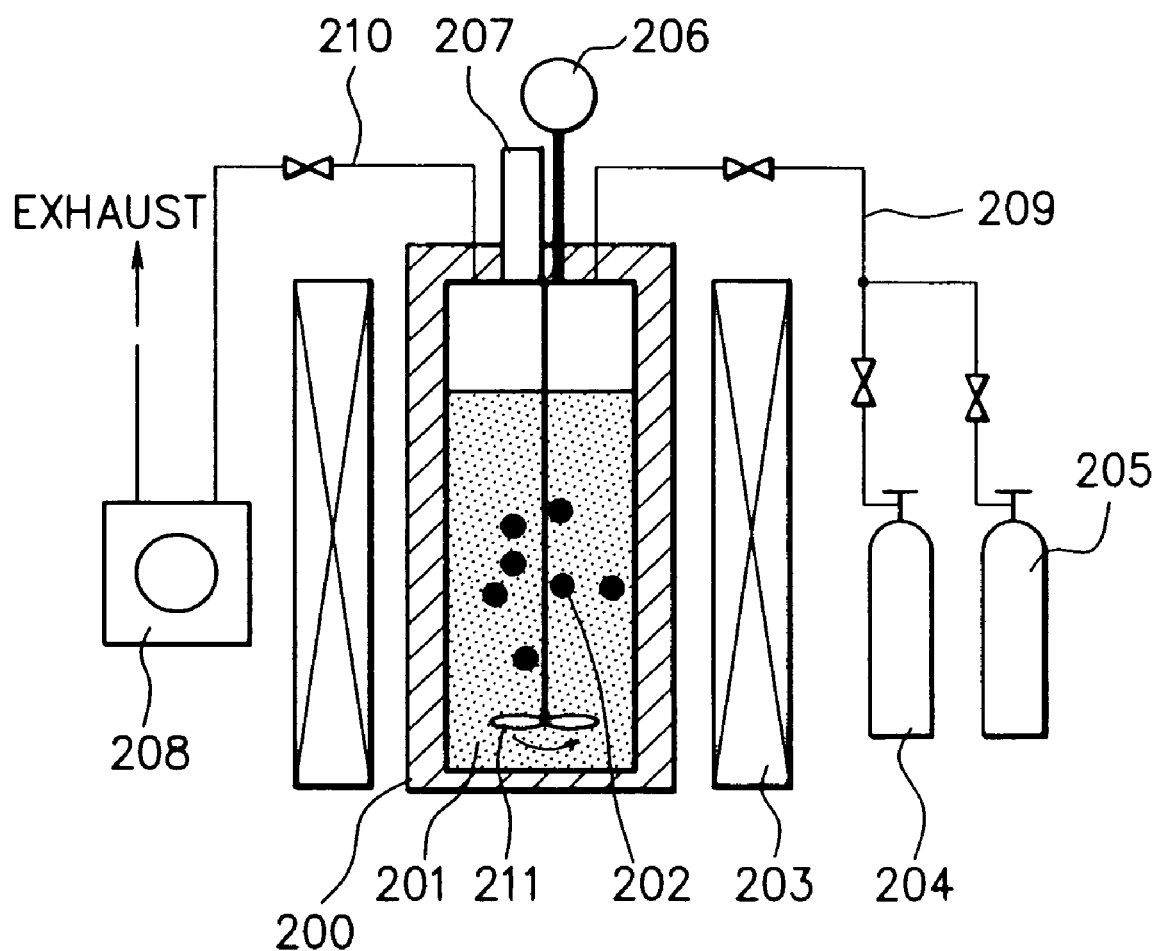

F I G. 4
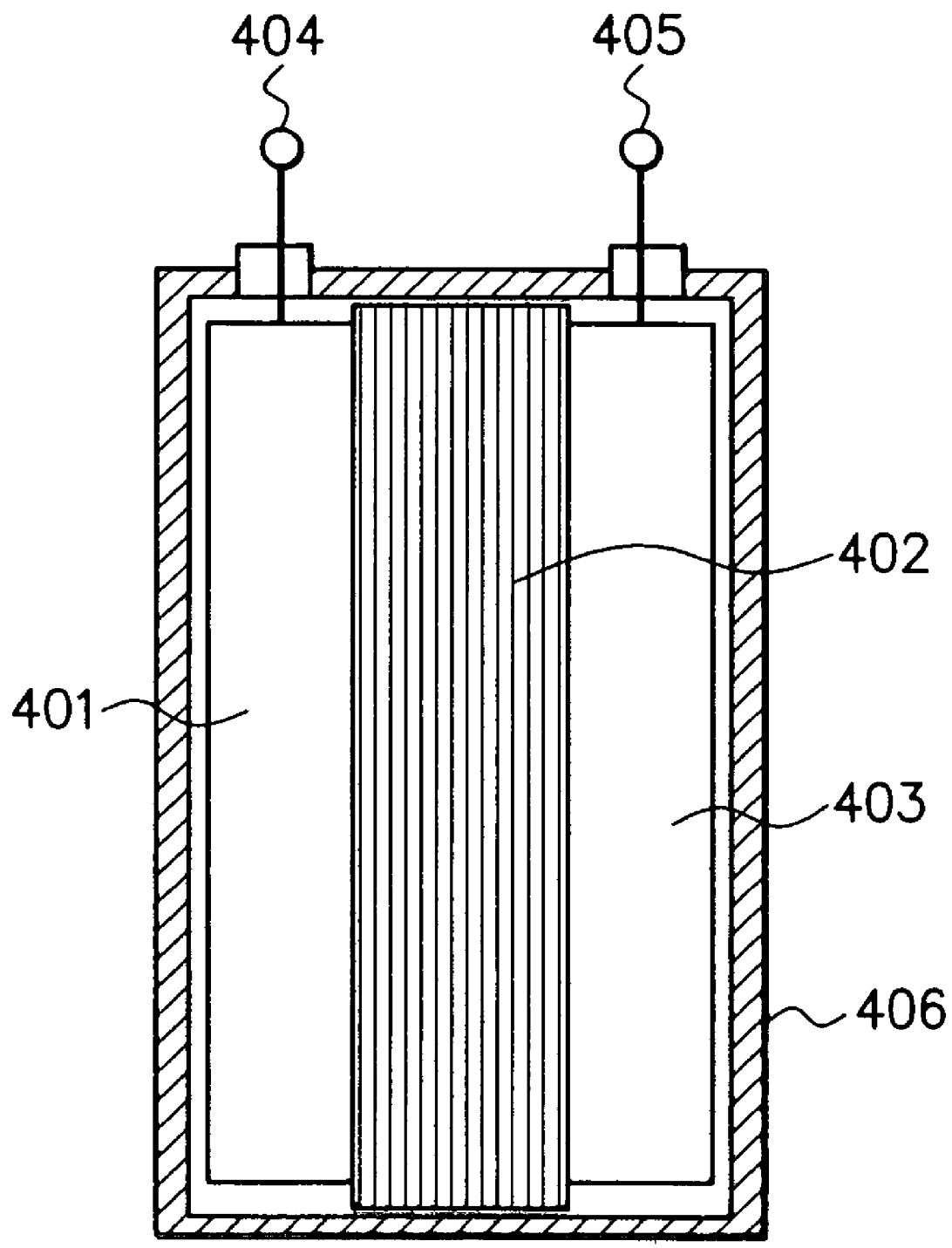

F I G. 7
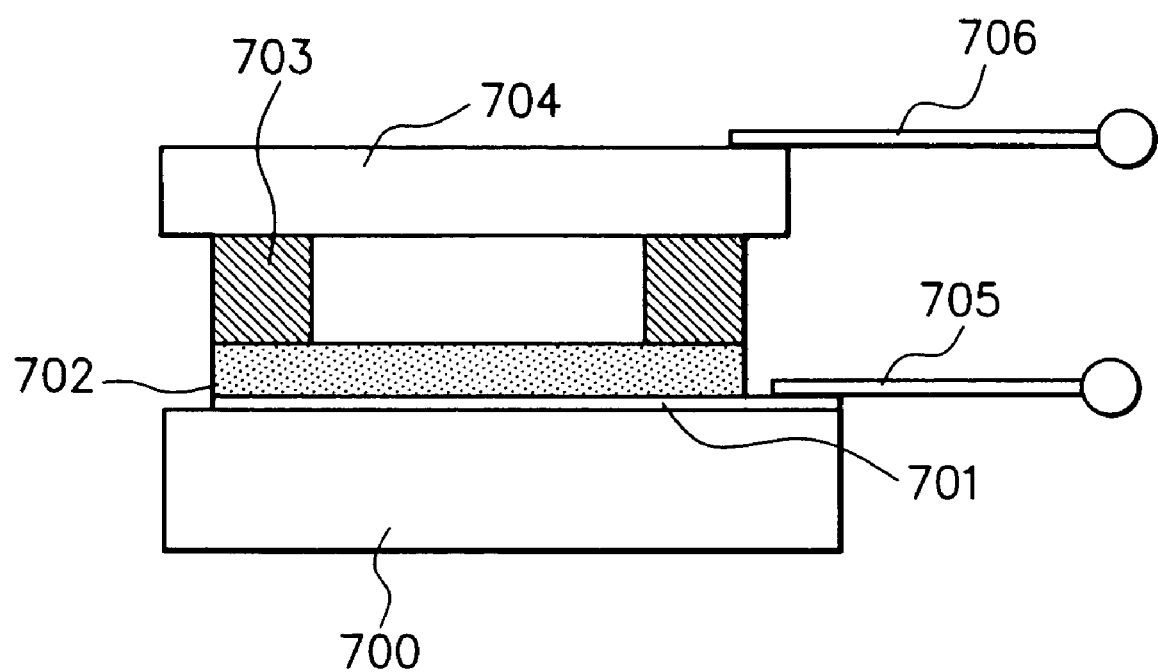

F I G. 9
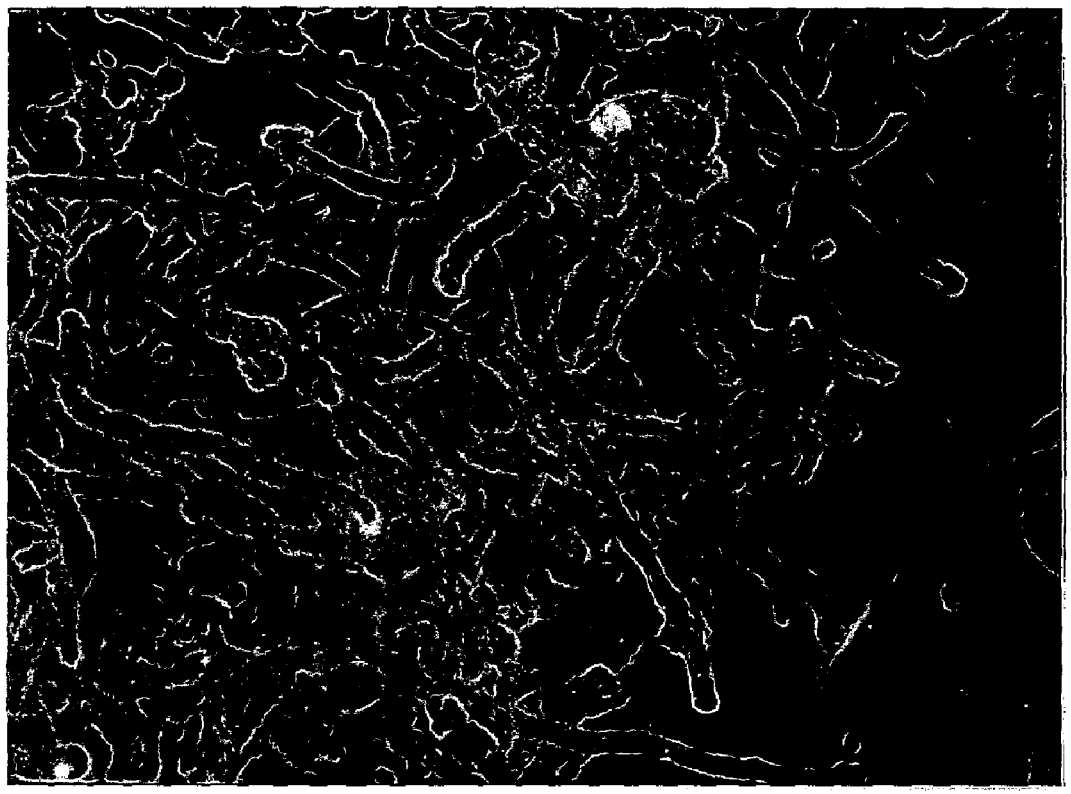

F I G. 11
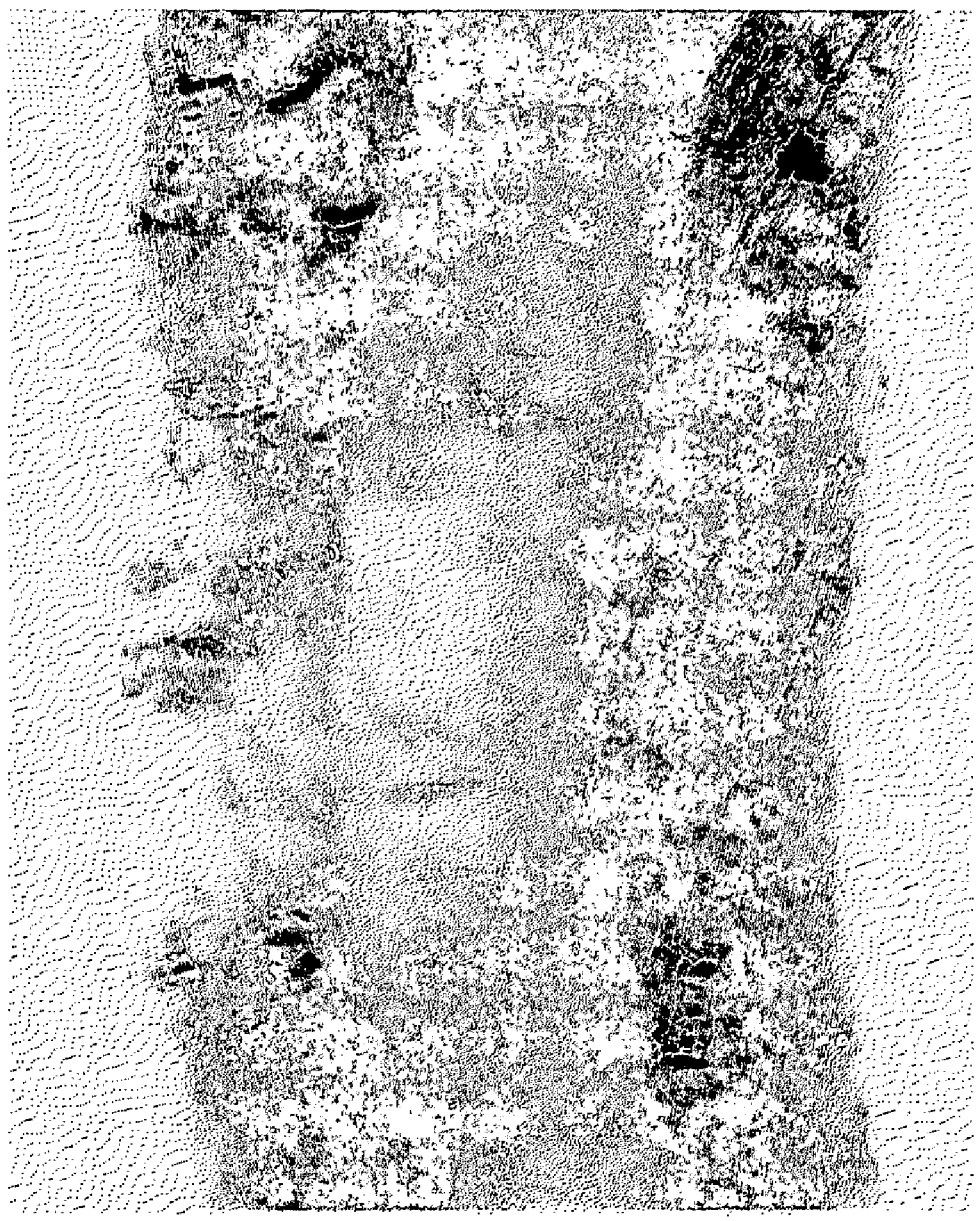

F I G. 14
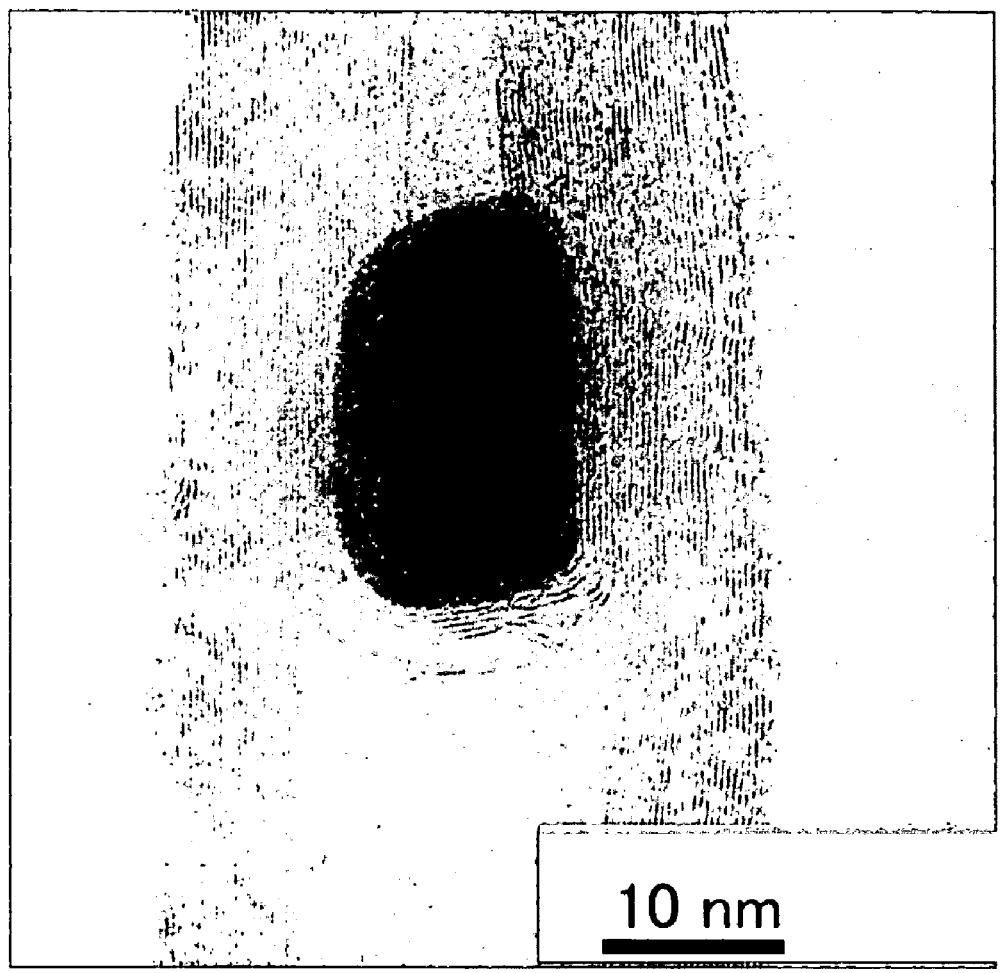

F I G. 15
2.40 μm 2.40 μm

METHOD FOR PRODUCING NANO-CARBON MATERIALS

BACKGROUND OF THE INVENTION

1. Field of the Invention

The present invention relates to a method for producing nano-carbon materials. More particularly, the present invention relates to a method, which enables one to quantitatively produce nano-carbon materials from a relatively inexpensive starting material in a simple manner using a relatively inexpensive reaction apparatus. The nano-carbon materials produced according to the present invention include carbon nanotubes, carbon nanofibers, and the like.

2. Related Background Art

A fullerene $C_{60}$ having a soccer ball-like polyhedral molecular structure comprising 60 carbon atoms was discovered by H. W. Kroto, R. E. Smallry and R. F. Curl in 1985. Following the discovery of the fullerene $C_{60}$, a carbon nanotube (CNT) corresponding to a cylindrical molecule of a fullerene, specifically having a molecular structure in which a graphene sheet (a single atomic layer of crystalline graphite) rolled up into a cylinder, was discovered by lijima in 1991. Since then, other carbon nanotubes have been discovered, and various studies on their industrial application have been carried out.

It has also been reported that these carbon nanotubes have an excellent field emission performance, a function to take up and store lithium therein and release said lithium in the electrochemical reaction, a large specific surface area and a good conductivity. In view of this, researches have been conducted regarding the use of these carbon nanotubes as electrode materials in FEDs (field emission displays), as electrode materials in rechargeable lithium batteries, as catalyst-retaining materials in fuel cells in which polymer solid electrolytes are used, and as hydrogen storage materials in hydrogen storage systems.

As the method for producing such carbon nanotubes, there are known a method wherein arc-discharge is generated in an gas atmosphere containing a carbon material such as hydrocarbon, a method wherein a target comprising graphite is evaporated by irradiating a laser thereto, and a method wherein a gaseous carbon material comprising acetylene or the like is subjected to thermal decomposition on a substrate having a catalyst of cobalt metal or nickel metal arranged thereon.

Particularly, Japanese Laid-open Patent Publication 6(1994) -157016 (hereinafter referred to as "Patent Document 1") discloses a method for producing carbon nanotubes, wherein arc-discharge is generated between a pair of carbon rods respectively as a positive electrode and a negative electrode in an inert gas atmosphere to deposit a carbon nanotubes-containing solid material on the negative electrode.

Japanese Laid-open Patent Publication P2000-95509A (hereinafter referred to as "Patent Document 2") discloses a method for producing carbon nanotubes, wherein a rod-shaped positive electrode containing carbon and non-magnetic transition metal and a rod-shaped negative electrode comprising graphite are arranged such that their tips are opposed to each other and arc-discharge is generated between the tip of the positive electrode and that of the negative electrode in an inert gas atmosphere to deposit carbon nanotubes on the tip portion of the negative electrode.

Japanese Laid-open Patent Publication 9(1997) -188509 (hereinafter referred to as "Patent Document 3") discloses a method for producing carbon nanotubes, wherein a carbon material and a metal catalyst are supplied into a high frequency plasma generated to deposit carbon nanotubes on a substrate.

Japanese Laid-open Patent Publication 10(1998) -273308 (hereinafter referred to as "Patent Document 4") discloses a method for producing carbon nanotubes, wherein a graphite-containing carbon rod is positioned in a quartz tube arranged in an electric furnace and laser light is irradiated onto the carbon rod in an inert gas atmosphere to deposit carbon nanotubes on the inner wall face of the quartz tube.

Japanese Laid-open Patent Publication P2000-86217A (hereinafter referred to as "Patent Document 5") discloses a method for producing carbon nanotubes, wherein gaseous hydrocarbon is thermally decomposed on a catalyst comprising a molybdenum metal or a molybdenum metal-containing material to deposit carbon nanotubes on said catalyst.

Separately, *Carbon* Vol. 36, No. 7-8, pp. 937-942, 1998 (Yury G. Gogotsi et al.) [hereinafter referred to as "Non-patent Document 1"] describes a method wherein filamentous carbons are formed from paraformaldehyde by way of hydrothermal reaction at a temperature of 700 to 750° C. under 100 MPa pressure for 150 hours.

*Journal of Materials Research Society*, Vol. 15, No. 12, pp. 2591-2594, 2000 (Yury Gogotsi et al.) [hereinafter referred to as "Non-patent Document 2"] describes a method wherein multi-wall carbon nanotubes are formed from polyethylene by way of pyrolysis of said polyethylene in the presence of nickel at a temperature of 700 to 800° C. under 100 MPa.

*Journal of American Chemical Society* Vol. 123, No. 4, pp. 741-742, 2001 (Jose Maria Calderon et al.) [hereinafter referred to as "Non-patent Document 3"] describes a method wherein multi-wall carbon nanotubes are formed from amorphous carbon through a hydrothermal treatment of the amorphous carbon in the absence of a metal catalyst at a temperature of 800° C. under 100 MPa pressure for 48 hours.

However, the methods disclosed in patent Documents 1 to 5 have disadvantages such that the starting material and the apparatus used for practicing the method are costly and therefore a product obtained becomes unavoidably costly and it is difficult to quantitatively produce nano-carbon materials.

Similarly, the methods described in Non-patent Documents 1 to 3 have disadvantages in that because high pressure of 100 MPa is used, a specific high pressure capsule made of Au (which is costly) and which can withstand such high pressure is employed as the reaction vessel, and the starting material and water are introduced into the capsule, wherein the starting material is subjected to a hydrothermal reaction at a high temperature (700 to 800° C.) under a high 100 MPa pressure. Therefore, a product obtained by any of these methods unavoidably becomes costly. Non-patent Documents 1 to 3 do not even suggest a method in which nano-carbon materials (including carbon nanotubes or filamentous carbons) can be formed under low pressure condition of less than 60 MPa, using a relatively inexpensive pressure reaction vessel without the necessity of using an expensive pressure reaction vessel.

There is a demand for providing a method capable of quantitatively producing nano-carbon materials (including carbon nanotubes and carbon nanofibers) at a reasonable production cost from relatively inexpensive raw material in a simple manner under low pressure, which does not require the use of a specific and costly pressure reaction vessel as described above.

Separately, *Carbon Vol.* 40, pp. 2961-2973, 2002 (Mingwang Shao et al.) [hereinafter referred to as "Non-patent Document 4"] describes a method wherein carbon nanotubes having a multi-layered structure are formed by reacting benzene as a starting material with a nickel-iron powder as a catalyst at a temperature of 480° C. under a reaction pressure of about 15 Pa pressure for 12 hours in a stainless steel autoclave. Although this method is advantageous in that the reaction pressure upon forming a nano-carbon material (a carbon nanotube having a multi-layered structure) is low (about 15 Pa), the method has a disadvantage in that the amount of a nano-carbon material produced in the reaction after a relatively long time (12 hours) is small. In particular, a ratio of the weight of the nano-carbon material produced to the weight of the catalyst used is 4.2, which is small. In addition, according to the results of the measured Raman spectrum of the obtained nano-carbon material, which results are described in Non-patent Document 4, it is understood that for the relative intensity between the so-called G-band peak near 1590 cm$^{-1}$ due to a lattice vibration in the hexagonal lattice network of the carbon atoms and the so-called D-band peak near 1350 cm$^{-1}$ due to a lattice defect of the carbon atoms, the intensity of the peak near 1350 cm$^{-1}$ is stronger. This means that the nano-carbon material obtained by the method described in Non-patent Document 4 is accompanied by a number of lattice defects. Thus, although the method described in Non-patent Document 4 has an advantage in that the reaction pressure upon forming a nano-carbon material is low, it is difficult to stably produce a nano-carbon material with only a slight lattice defect. It is desirable to improve the method described in Non-patent Document 4 so that it can stably produce a high-quality nano-carbon material with few lattice defects in a shortened reaction time.

In addition, such nano-carbon materials as described above are expected to be widely used in various technical fields, for instance, as electrode materials in FEDs (field emission displays), as electrode materials in rechargeable lithium batteries, and as catalyst-retaining materials in fuel cells. In view of this, there is a demand for a technique, which can enable one to efficiently produce high-quality nano-carbon materials at a reasonable production cost.

SUMMARY OF THE INVENTION

The present invention has been accomplished in view of the circumstances in the prior art for the production of nano-carbon materials.

The present invention makes it an object to provide a method, which enables one to efficiently and quantitatively produce high quality nano-carbon materials, which are effectively usable as electrode materials in FEDs (field emission displays), as electrode materials in rechargeable lithium batteries, and as catalyst-retaining materials in fuel cells, at a reasonable production cost from relatively inexpensive raw material in a simple manner.

The method for producing nano-carbon materials in the present invention typically includes the following two embodiments.

A first embodiment that is characterized by having a step (a), wherein (i) a starting material comprising one or more kinds of compounds selected from the group consisting saturated hydrocarbons, unsaturated hydrocarbons, saturated cyclic hydrocarbons, and alcohols, whose atomic ratio of the component carbon to the component oxygen is more than 2.0, and (ii) a catalyst comprising one or more kinds of materials selected from the group consisting of transition metal element-containing materials, alumina, silica, and silicon carbides are together treated at a temperature in a range of from 100 to 800° C. while being compressed at a pressure in a range of from 0.2 to 60 MPa, where said starting material is converted into a supercritical fluid or a subcritical fluid while the supercritical fluid or the subcritical fluid is contacted with the catalyst, thereby obtaining a reaction product.

A second embodiment is characterized by having a step (b), wherein (i) a starting material comprising one or more kinds of compounds selected from the group consisting saturated chain hydrocarbons, unsaturated chain hydrocarbons, saturated cyclic hydrocarbons, and alcohols, whose atomic ratio of the component carbon to the component oxygen is more than 2.0, (ii) a catalyst comprising one or more kinds of materials selected from the group consisting of transition metal element-containing materials, alumina, silica, and silicon carbides and (iii) a supplementary material capable of functioning as a reaction promotion medium are together treated at a temperature in a range of from 100 to 800° C. while being compressed at a pressure in a range of from 0.2 to 60 MPa, where at least the supplementary material is converted into a supercritical fluid or a subcritical fluid and the starting material is contacted with the supercritical fluid or the subcritical fluid formed from the supplementary material while being contacted with said catalyst, thereby obtaining a reaction product.

The supercritical fluid means a fluid having liquid properties and gaseous properties and which is in a state with a temperature and a pressure, respectively, exceeding the critical point (the critical temperature and the critical pressure) where gas and liquid can together exist. The subcritical fluid means a fluid following the supercritical fluid. Specifically, when the above critical temperature is $T_0$ (absolute temperature) and the above critical pressure is $P_0$ (MPa), the subcritical fluid is a fluid that is in a state with an absolute temperature T and a pressure P, which satisfy the following relationships:

$T \geq 0.8 T_0$ $P \geq 0.8 P_0$.

In the method of the present invention, it is preferable for the pressure to be from 2 to 40 MPa. Similarly, it is preferred to make the temperature to fall in a range of from 200 to 650° C.

In the method of the present invention in each of the first embodiment and the second embodiment, it is preferred that the starting material is in the liquid or gaseous state in an atmosphere at normal temperature and normal pressure and has a dielectric constant in a range of from 1.5 to 25.0 at 25° C.

In the method of the first embodiment in the present invention, it is possible that a supplementary material capable of functioning as a reaction promotion medium is made to coexist with the starting material, which has been converted into the supercritical fluid or the subcritical fluid such that the supplementary material is contacted with the supercritical fluid or the subcritical fluid, which is formed from the starting material, wherein the supplementary material comprises at least one kind of a material selected from the group consisting of a solvent to dissolve said starting material, a solvent to dissolve the catalyst, water, helium gas, argon gas, nitrogen gas, hydrogen gas, carbon monoxide, nitrous oxide, and ammonia.

Similarly, in the method of the first embodiment in the present invention, it is possible that a supplementary material capable of functioning as a reaction promotion medium is made to coexist with the starting material, which is converted into the supercritical fluid or the subcritical fluid such that the supplementary material is contacted with the starting material, wherein the supplementary material comprising at least one kind of a material selected from the group consisting of a solvent to dissolve the starting material, a solvent to dissolve the catalyst, water, helium gas, argon gas, nitrogen gas, hydrogen gas, carbon monoxide, nitrous oxide, and ammonia.

The solvent to dissolve the starting material is preferred to comprise at least one kind of a material selected from the group consisting of carbon dioxide, aromatic hydrocarbons, and ethers.

The transition metal element of the transition metal element-containing material, as the catalyst, is preferred to be a transition element selected from the group consisting of Ni, Co, Fe, Cu, Ag, Cr, W, Mo, Ti, Ru, Rh, and Pd.

The transition metal element-containing material may comprise at least one kind of a transition metal selected from the group consisting of transition metals of aforesaid transition metal elements or at least one kind of a transition metal compound selected from the group consisting of transition metal compounds of these transition metal elements.

The transition metal compound can include transition metal sulfides, transition metal carbides, organo transition metal compounds, transition metal nitrides, transition metal oxides, and salts of transition metals. These transition metal compounds may be used either singly or in a combination of two or more compounds.

In the method of each of the first embodiment and the second embodiment in the present invention, in the case where a transition metal element-containing material is used as the catalyst, it is possible that a surfactant is made to coexist with the transition metal element-containing material.

In the method of each of the first embodiment and the second embodiment in the present invention, there is produced a reaction product containing nano-carbon materials.

The method of each of the first embodiment and the second embodiment in the present invention further includes a step of subjecting the reaction product to a heat treatment at a temperature in a range of from 400 to 2800° C., in order to remove impurities, including amorphous carbons, contained in the nano-carbon materials and to make the nano-carbon materials with improved crystallinity. In the case where the graphitization is insufficient, it is preferred that the heat treatment is performed at a temperature in a range of from 600 to 2200° C. In a preferred embodiment, the heat-treating step is performed in such a way that the reaction product is subjected to a first heat treatment at a temperature in a range of from 400 to 900° C. Then, the reaction product is subjected to a second heat treatment at a temperature in a range of from 900 to 2800° C.

The heat treatment in the heat-treating step is preferably performed in a gas atmosphere composed of one or more gases selected from the group consisting of argon gas, helium gas and nitrogen gas.

The first embodiment and the second embodiment in the present invention preferably include a purification step in which the heat-treated product is purified. Specifically, in the case where the nano-carbon materials contained in the heat-treated reaction product contain a magnetic metal element obtained from the catalyst, the magnetic metal element-containing nano-carbon materials are collected by a magnet, whereby it is possible to obtain a purified nano-carbon materials-containing product. Separately, in the case where the nano-carbon materials contain a transition metal or a transition metal compound obtained from the catalyst and it is not necessary for the nano-carbon materials to contain such a transition metal or such transition metal compound, it is possible to remove such transition metal or such transition metal compound by washing with an acid or the like.

The nano-carbon materials produced according to the method of the present invention are somewhat different depending the related conditions, including the kind of the starting material used, the kind of the catalyst used, the kind of the supplementary material as the reaction promotion medium to form a supercritical fluid or a subcritical fluid to be contacted with the starting material, and the temperature and the pressure adopted in the synthesis reaction.

However, the nano-carbon materials produced according to the method of the present invention include nano-carbon materials comprising such aggregates as mentioned below which are identified by a scanning electron microscope (SEM). Particularly, the nano-carbon materials produced according to the method of the present invention typically include nano-carbon materials comprising aggregates of a plurality of filament-like shaped (or worm-like shaped) microunits and nano-carbon materials comprising aggregates of a plurality of tube-like shaped microunits, wherein the microunits in each case have an average diameter in a range of from 4 to 400 nm and an average length in a range of from 100 to 10000 nm. In the method of the present invention, these filament-like (or worm-like) or tube-like nano-carbon materials are likely to be produced at a desirably high purity. The diameters of these nano-carbon materials are liable to depend on the average particle size of a powdery catalyst used as the catalyst in the method of the present invention.

According to the observations via a transmission electron microscope (TEM) with respect to aforesaid microunits, the nano-carbon materials produced according to the method of the present invention include (a) nano-carbon materials having a microstructure in which a plurality of graphene sheets shaped in a cup-like or megaphone-like form, which are stacked and developed into a filament-like state, (b) nano-carbon materials having a microstructure in which a graphene sheet is wound in a length-wise direction parallel to or slanted toward a fiber axis into a single-layered tubular form or a multi-layered tubular form, (c) nano-carbon materials comprising a platelet type graphite nanofiber in which a plurality of graphene sheets are stacked vertically to a fiber axis or a herringbone type graphite nanofiber in which a plurality of graphene sheets are stacked at an angle to a fiber axis, and (d) nano-carbon materials having a microstructure in which a graphene sheet is developed into a sphere form or a disk form.

BRIEF DESCRIPTION OF THE DRAWINGS

FIG. 1 shows a flow chart illustrating an example of the method for producing nano-carbon materials in the present invention.

FIG. 2 is a schematic cross-sectional view illustrating an example of a reaction apparatus used for producing nano-carbon materials according to the method of the present invention.

FIG. 4 is a schematic cross-sectional view illustrating an example of a rechargeable lithium battery in which a nano-carbon material obtained according to the method of the present invention is applied.

FIG. 7 is a schematic cross-sectional view illustrating an example of an element for examining the field emission performance of a nano-carbon material.

FIG. 9 shows a SEM (scanning electron microscope) image of a nano-carbon material produced according to the method of the present invention in Example 1, which will be described later.

FIG. 11 shows another TEM image (observed at a high magnification) of a nano-carbon material produced by the method of the present invention in Example 1, which will be described later.

FIG. 14 shows a TEM image of a nano-carbon material produced according to the method of the present invention in Example 10, which will be described later.

FIG. 15 shows a SEM image of a nano-carbon material produced by the method of the present invention in Example 11, which will be described later.

DETAILED DESCRIPTION OF THE INVENTION AND PREFERRED EMBODIMENTS

Figure 3:
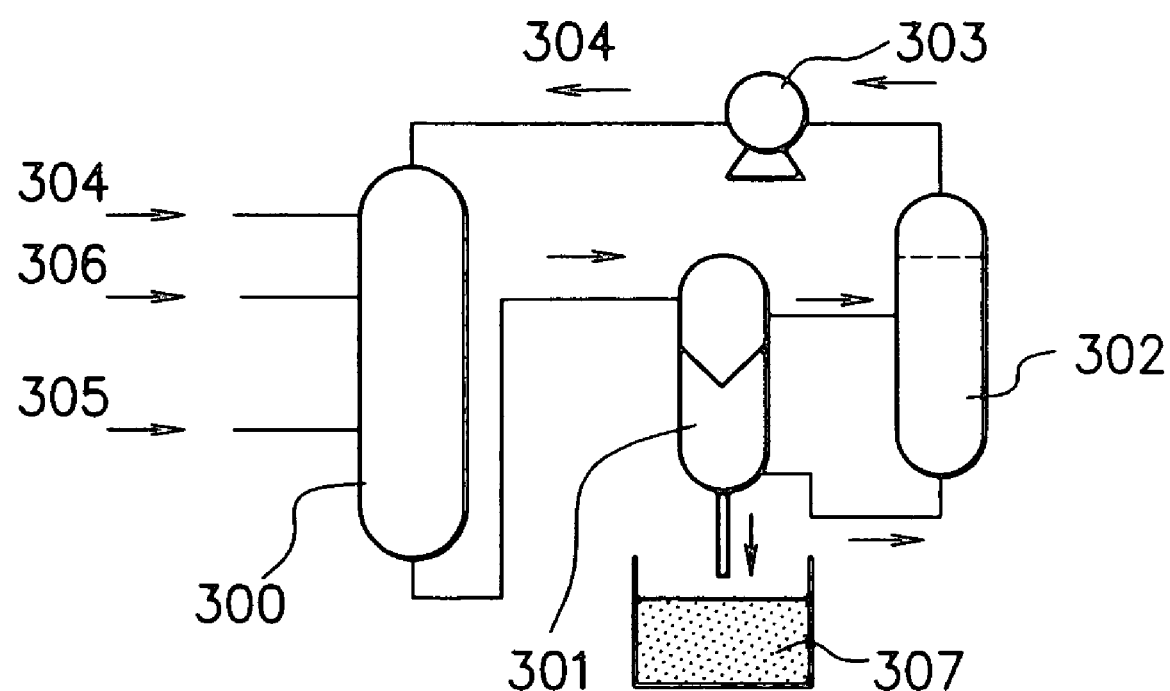
FIG. 3 is a schematic cross-sectional view illustrating another example of a reaction apparatus used for producing nano-carbon materials according to the method of the present invention.

As previously described, the present invention provides a method, which enables one to quantitatively produce nano-carbon materials. The method for producing nano-carbon materials in the present invention typically includes the following two embodiments.

The first embodiment is characterized by having a step (a), wherein (i) a starting material comprising one or more kinds of compounds selected from the group consisting saturated hydrocarbons, unsaturated hydrocarbons, saturated cyclic hydrocarbons, and alcohols, whose atomic ratio of the component carbon to the component oxygen is more than 2.0, and (ii) a catalyst comprising one or more kinds of materials selected from the group consisting of transition metal element-containing materials, alumina, silica, and silicon carbides are together treated at a temperature in a range of from 100 to 800° C. while being compressed at a pressure in a range of from 0.2 to 60 MPa, where the starting material is converted into a supercritical fluid or a subcritical fluid while the supercritical fluid or the subcritical fluid is contacted with the catalyst, thereby obtaining a reaction product.

The second embodiment is characterized by having a step (b), wherein (i) a starting material comprising one or more kinds of compounds selected from the group consisting saturated hydrocarbons, unsaturated hydrocarbons, saturated cyclic hydrocarbons, and alcohols, whose atomic ratio of the component carbon to the component oxygen is more than 2.0, (ii) a catalyst comprising one or more kinds of materials selected from the group consisting of transition metal element-containing materials, alumina, silica, and silicon carbides, and (iii) a supplementary material capable of functioning as a reaction promotion medium are together treated at a temperature in a range of from 100 to 800° C. while being compressed at a pressure in a range of from 0.2 to 60 MPa, where at least the supplementary material is converted into a supercritical fluid or a subcritical fluid and the starting material is contacted with the supercritical fluid or the subcritical fluid formed from the supplementary material while being contacted with the catalyst, thereby obtaining a reaction product. In this case, it is possible that the starting material is also converted into a supercritical fluid or a subcritical fluid. The supplementary material comprises at least one kind of a material selected from the group consisting of a solvent to dissolve said starting material, a solvent to dissolve the catalyst, water, helium gas, argon gas, nitrogen gas, hydrogen gas, carbon monoxide, nitrous oxide, and ammonia.

As specific preferable examples of the saturated hydrocarbon used as the starting material, there can be mentioned methane, ethane, propane, butane, pentane, hexane, heptane, octane, nonane, decane, undecane, dodecane, tridecane, tetradecane, pentadecane, hexadecane, heptadecane, octadecane, nonadecane, eicosane, isobutene, dimethylbutane, trimethylpentane, methyloctane, methylheptane, and methylpentane. These saturated chain hydrocarbons may be used either singly or in a combination of two or more compounds.

Of these saturated hydrocarbons, pentane, hexane, heptane, octane, nonane, decane, undecane, dodecane, tridecane, pentadecane, hexadecane, heptadecane, octadecane, and nonadecane are more preferable, because these are in the liquid or solid state at normal temperature and normal pressure and can be easily handled. In terms of acquisition cost, n-hexane and methane are preferable, because they can be readily acquired at a reasonable cost.

As specific preferable examples of the unsaturated hydrocarbon used as the starting material, there can be mentioned ethylene, propene (propylene), butane, pentene, hexene, heptene, octene, nonene, decene, methylpropene, cyclohexene, cyclopentene, butadiene, propadiene, acetylene, and propyne. These unsaturated hydrocarbons can be used either singly or in a combination of two or more compounds.

Of these unsaturated hydrocarbons, ethylene, propene, and butadiene are more preferable, because they can be readily acquired at a reasonable cost and they have a high conversion efficiency when converted into a nano-carbon material.

As specific preferable examples of the saturated cyclic hydrocarbon used as the starting material, there can be mentioned cyclopropane, cyclobutane, cyclopentane, cyclohexane, cycloheptane, cyclooctane, cyclononane, cyclodecane, methylcyclohexane, methylcyclopentane, dimethylcyclopentane, and decalin. These saturated cyclic hydrocarbons can be used either singly or in a combination of two or more compounds.

As specific preferable examples of the alcohol with an atomic ratio of the component carbon to the component oxygen of more than 2.0, used as the starting material, there can be mentioned ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, isobutyl alcohol, propanol, t-butanol, methylbutanol, pentanol, cyclohexanol, and allyl alcohol. These alcohols can be used either singly or in a combination of two or more alcohols.

Of these alcohols, propanol and butanol are more preferable, because they can be readily acquired at a reasonable cost and they have a high conversion efficiency with respect to being converted to a nano-carbon material.

Besides those mentioned above, a liquefied natural gas containing methane, as a main component, as well as ethane, propane, butane, nitrogen, carbon dioxide, and a sulfur compound and a liquefied petroleum gas comprising a mixture composed of propane, propylene, n-butane, isobutene, butylene, and isobutylene can be used as the starting material. To use the liquefied natural gas or the liquefied petroleum gas is advantageous, because they are relatively inexpensive.

However, of the starting materials mentioned above, the unsaturated hydrocarbons are the most appropriate, because they have a desirably high conversion efficiency with respect to being converted to a nano-carbon material. For the same reason, it is considered such that these materials are inherently liable to cause a polymerization reaction. Because of this, when contacted with the catalyst at a temperature in a range of from 100 to 800° C. and at a pressure in a range of from 0.2 to 60 MPa, C=C bonds are readily formed to provide nano-carbon materials.

In order to make it possible for a reaction product to be readily separated from the unreacted remainder of the starting material, it is more preferable for the starting material to be in the liquid or gaseous state in an atmosphere at normal temperature and normal pressure. However, in terms of ease of handling, it is more preferable for the starting material to be in the liquid state. In terms of ease of separation of a reaction product from the unreacted remainder of the starting material, it is more preferable for the starting material to be in the gaseous state.

In order to easily carry out the preparation and readily perform the separation of the reaction product from the unreacted remainder of the starting material, it is possible to have the starting material in the gaseous state in an atmosphere at normal temperature and normal pressure liquefied or solidified by cooling the starting material, followed by being introduced into a reaction vessel.

The previously illustrated saturated hydrocarbons, unsaturated hydrocarbons, saturated cyclic hydrocarbons, and alcohols whose atomic ratio of the component carbon to the component oxygen is more than 2.0 may be used as the starting material either singly or in combination of two or more compounds. It is possible to use an aromatic compound in combination with one of these materials or a mixture comprising two or more of these materials.

Such an aromatic compound can include benzene, ethylbenzene, butylbenzene, toluene, xylene, styrene, biphenyl, phenylacetylene, phenol, ethylphenol, fluoranthene, pyrene, chrysene, phenanthrene, anthracene, naphthalene, methylnaphthalene, and fluorene, acenaphthene. Besides, pitch, pitch coke, petroleum coke, and coal tar, which are aromatic compound-containing materials, may be used instead of the aromatic compound.

Now, the starting material used in the method of the present invention is converted into a supercritical fluid or a subcritical fluid at a temperature in a range of from 100 to 800° C. and a pressure in a range of from 0.2 to 60 MPa in the presence of the catalyst.

Here, the critical temperature and the critical pressure at which hexane belonging to the saturated hydrocarbon as the starting material is converted into a supercritical fluid are, respectively, 234.4° C. and 2.97 MPa. The critical temperature and the critical pressure at which methane belonging to the saturated hydrocarbon as the starting material is converted into a supercritical fluid are, respectively, −82.45° C. and 4.95 MPa. Separately, the critical temperature and the critical pressure at which ethylene belonging to the unsaturated hydrocarbon as the starting material is converted into a supercritical fluid are, respectively, 9.65° C. and 5.076 MPa. The critical temperature and the critical pressure at which propylene belonging to the unsaturated hydrocarbon as the starting material is converted into a supercritical fluid are, respectively, 92° C. and 4.62 MPa. The critical temperature and the critical pressure at which acetylene belonging to the unsaturated hydrocarbon as the starting material is converted into a supercritical fluid are, respectively, 35.33° C. and 6.139 MPa. The critical temperature and the critical pressure at which 1-butanol belonging to the alcohol whose atomic ratio of the component carbon to the component oxygen is more than 2.0 as the starting material is converted into a supercritical fluid are, respectively, 289.93° C. and 4.413 MPa.

Now, in terms of ease of handling, it is advantageous for the starting material to have a boiling point, which is higher than 30° C., so that this material is in the liquid or solid state under room temperature conditions. In terms of ease of separation of a reaction product from the unreacted remainder of the starting material, it is advantageous for the starting material to be in the gaseous or solid state under room temperature conditions.

As previously described, the starting material may by itself be used. However, it is possible to use the starting material together with other appropriate materials.

As such other appropriate materials, it is preferred to use materials capable of functioning as a medium (a reaction promotion medium) to promote the synthesis reaction to form nano-carbon materials from the starting material when the material in an ordinary state (not yet having been converted into a supercritical or subcritical fluid state) is contacted with the starting material, when the material having converted into a supercritical or subcritical state is contacted with the starting material not yet having been converted into a supercritical or subcritical fluid state, or when the material having converted into a supercritical or subcritical fluid state is contacted with the starting material having converted into a supercritical or subcritical fluid state.

In any of these cases, it is more preferred that the material comprises a solvent for the starting material. In the case where, in addition to the starting material, a solvent for the starting material is used in the formation of nano-carbon materials from the starting material, it is preferred for the starting material to have a dielectric constant in a range of from 1.5 to 25.0, in order for the starting material and the solvent to be uniformly mixed with each other.

As previously described, the supercritical fluid used in the present invention is a fluid having liquid properties and gaseous properties and which is in a state with a temperature and a pressure respectively exceeding the critical point (the critical temperature and the critical pressure) where a gas and a liquid can together exist. The subcritical fluid used in the present invention is a fluid that follows the supercritical fluid. Specifically, when the above critical temperature is $T_0$ (absolute temperature) and the above critical pressure is $P_0$ (MPa), the subcritical fluid is a fluid, which is in a state with an absolute temperature T and a pressure P, which satisfy the following relationships:

$T \geq 0.8 T_0$ $P \geq 0.8 P_0$.

The reaction to form nano-carbon materials in the method of the present invention may be performed, for instance, in the following manner.

The starting material and the catalyst, and if necessary, such a reaction promotion medium as described above, are introduced into a substantially enclosed pressure reaction vessel. The starting material, the catalyst and the reaction promotion medium introduced into the reaction vessel are heated while being compressed at a prescribed temperature and a prescribed pressure so that the starting material is converted into a supercritical fluid or a subcritical fluid, wherein the starting material (which is converted into said supercritical fluid or said subcritical fluid) is contacted with the catalyst and the reaction promotion medium to cause a reaction of the starting material, whereby nano-carbon materials are synthesized.

In the alternative, the reaction to form nano-carbon materials in the method of the present invention may be performed in the following manner.

The starting material, the catalyst and a given reaction promotion medium capable of forming a supercritical fluid or a subcritical fluid are introduced into the pressure reaction vessel. The starting material, the catalyst and the reaction promotion medium introduced in the reaction vessel are heated while being compressed at a prescribed temperature and a prescribed pressure so that the reaction promotion medium is converted into a supercritical fluid or a subcritical fluid, wherein the starting material is contacted with the supercritical fluid or the subcritical fluid formed from the reaction promotion medium and also contacted with the catalyst to cause a reaction of the starting material, whereby nano-carbon materials are synthesized. In this case, it is possible that the starting material itself is converted into a supercritical fluid or a subcritical fluid at the same time of converting the reaction promotion medium into the supercritical fluid or the subcritical fluid.

The heating temperature and the compressing pressure mentioned above are somewhat different depending upon the kind of material used for forming the supercritical fluid or the subcritical fluid. However, in general, it is desirable for the heating temperature to be in a range of from 100 to 800° C. and for the compressing pressure to be in a range of from 0.2 to 60 MPa in terms of ease of carrying out the reaction, preventing an increase in the cost of the apparatus used, and reduction of the operation energy. In terms of an increase in the yield of a nano-carbon material, prevention of an increase in the cost of the apparatus used and reduction of the operation energy, it is desirable for the heating temperature to be preferably in a range of from 300 to 800° C., or more preferably in a range of from 300 to 650° C., and for the compressing pressure to be in a range of from 2 to 30 MPa.

In the method of the present invention, it is preferred that not only the starting material, but also other materials that are used for synthesizing nano-carbon materials, are respectively in a supercritical fluid state, because the reaction velocity of synthesizing nano-carbon materials is increased in this case. Here, the critical pressure of the starting material used in the method of the present invention is more than 1.1 MPa.

The catalyst used in the method of the present invention is preferably in a powder form. In the case where a given transition metal element-containing material in a powder form is used as the catalyst, when the transition metal element-containing material is contacted with air during the handling, or when it is contacted with oxygen in the reaction vessel, a transition metal oxide film such as a nickel oxide film, a cobalt oxide film or an iron oxide film is liable to form so as to cover the surface of the transition metal element-containing material. It is necessary that the surface of the transition metal element-containing material, which is covered with such transition metal oxide film, be exposed by being reduced with hydrogen or carbon monoxide generated during the reaction in the reaction vessel. Here, the reduction of nickel oxide, cobalt oxide and iron oxide with hydrogen or carbon monoxide is started from about 200° C. Therefore, in the case where the transition metal element-containing material is used as the catalyst, it is preferred that the reaction to produce nano-carbon materials in the reaction vessel is performed at a temperature of 300° C. or more.

In the method of the present invention, in the case where a supplementary material capable of forming a supercritical fluid or a subcritical fluid is used other than the starting material, the supplementary material preferably comprises at least one kind of material selected from the group consisting of a solvent to dissolve the starting material, a solvent to dissolve the catalyst, water, helium gas, argon gas, nitrogen gas, hydrogen gas, carbon monoxide, nitrous oxide, and ammonia.

It is considered that these supplementary materials function as a reaction promotion medium to promote the synthesis reaction to form nano-carbon materials from the starting material. The dielectric constant of the supercritical fluid or the subcritical fluid, which is formed from any of aforesaid supplementary materials, is relatively low, and that of the starting material is also relatively low, as previously described. In view of this, it is considered that the supercritical fluid or the subcritical fluid, which is formed from any of aforesaid supplementary materials, becomes a good solvent for the starting material. In this connection, in the case where the supplementary material is used, it is preferred that the heating temperature and the compression pressure in the method of the present invention exceed the critical temperature and the critical pressure of the supplementary material.

In the case where the starting material itself has been converted into a supercritical fluid or a subcritical fluid, this material is in a very active state where a reaction is liable to readily occur. Upon the synthesis of nano-carbon materials according to the method of the present invention, it is preferred that not only the fluid of the starting material, but also the fluids of other materials used for the synthesis of nano-carbon materials, are in a supercritical state.

In the method of the present invention, it is preferred that not only the starting material, but also the reaction promotion medium (the foregoing supplementary material), comprise a material capable of being converted into a supercritical fluid at a temperature in a range of from 100 to 800° C. and a pressure in a range of from 0.2 to 60 MPa.

As previously described, the catalyst used in the method of the present invention is preferably in a powder form.

The sizes of nano-carbon materials synthesized are quite liable to greatly depend on the particle sizes of the catalyst in a powder form. In order to obtain nano-carbon materials, which are substantially uniform with respect to their sizes, it is necessary for the catalyst to be finely powdered to comprise fine particles and for these catalyst fine particles to be sufficiently contacted with the starting material so that each of the catalyst fine particles is contacted with the starting material. In this respect, it is preferred that a solvent capable of dissolving the starting material or/and the catalyst (the catalyst fine particles) is mixed with the starting material and the catalyst. Separately, in order to desirably disperse the catalyst fine particles in a state in which they are not aggregated, it is preferred to add a surfactant to the solvent.

Specific examples of such a solvent to dissolve the starting material and/or the catalyst include carbon dioxide, water, alcohols, ethers, and aromatic compounds, such as toluene and benzene. These solvents may be used either singly or in combination of two or more as a mixed solvent. Specific examples of the alcohols include methanol, ethanol, and propyl alcohol.

Of the above-mentioned solvents, carbon dioxide is the most appropriate for the reasons, because besides functioning as the solvent, carbon dioxide itself is poor in terms of the reactivity. Thus, it is presumed that carbon dioxide will function to reduce the probability of the molecules of the starting material mutually colliding and preventing side reactions from occurring.

Here, the critical temperature and the critical pressure at which carbon dioxide is converted into a supercritical fluid are, respectively, 31° C. and 7.4 MPa. The critical temperature and the critical pressure at which water is converted into a supercritical fluid are respectively 374° C. and 22.0 MPa. The critical temperature and the critical pressure at which toluene belonging to the aromatic compound is converted into a supercritical fluid are, respectively, 319° C. and 4.11 MPa.

In the method of the present invention, it is possible to introduce an inert gas into the reaction system in order to synthesize highly pure nano-carbon materials while reducing the probability of the molecules of the starting material mutually colliding and preventing side reactions from occurring. As such inert gas, argon gas, helium gas, or nitrogen gas may be used. Separately, hydrogen gas is generated when the starting material is decomposed in the reaction system. This hydrogen gas has a reducing effect and an etching effect. Because of this, it is considered that this hydrogen gas functions to maintain the surface of the catalyst in an active state, to prevent the occurrence of the side reactions of forming amorphous carbon, which is structurally unstable, and to promote the growth of only strong and stable nano-carbon networks.

In the method of the present invention, when the starting material is converted into a supercritical fluid or a subcritical fluid and it is contacted with a given catalyst (comprising one or more kinds of materials selected from the group consisting of transition element-containing materials, silica, silicon carbide, and alumina), if it is necessary for a supercritical fluid or a subcritical fluid formed from the foregoing supplementary material to be the reaction promotion medium, the catalyst functions as a starting point to initiate the formation of nano-carbon materials from the starting material and the nano-carbon materials, which started forming, are gradually grown. In this case, it is considered that the transition metal element-containing material, alumina, silica or silicon carbide behaves like a catalyst. It is possible that a composite comprising a given transition metal retained on a silica, a zeolite or an alumina is used as the catalyst.

In the case where a given transition metal element-containing material, which is capable of being maintained in such a metal state that the valence number of the transition metal element is zero during the reaction of synthesizing nano-carbon materials, is used as the catalyst, filament-like nano-carbon materials are produced in a very large amount. As such a transition metal element-containing material, there can be mentioned transition metal powders, composites comprising a transition metal retained on a carrier having a large specific surface area, and organo transition metal compounds capable of providing a transition metal fine power when thermally decomposed.

Any one of the catalysts as described above is introduced into the reaction vessel together with the starting material and, if necessary, the supplementary material as the reaction promotion medium, where when the starting material or the reaction promotion medium is converted into a supercritical fluid or a subcritical fluid, the catalyst is contacted with the supercritical fluid or the subcritical fluid. It is not always necessary to externally add the catalyst. The catalyst may be a transition metal or a transition metal compound, which is originally contained in the starting material or which results when the starting material is converted into the supercritical fluid or the subcritical fluid or contacted with the supercritical fluid or the subcritical fluid formed from the reaction promotion medium. The constituent components of the reaction vessel may be used as the catalyst. It is possible to used plural kinds of these catalysts.

Such transition metal element-containing materials include, for example, transition metals and transition metal compounds. Also, composites comprising a transition metal element retained on a carrier comprising an oxide material having a large specific surface area, such as silica or zeolite, can be used. In this case, it is possible that two or more kinds of transition metal elements are retained on the carrier. The carrier in this case is not limited to such oxide materials. It is possible to use a carbon material having a large specific area, such as activated carbon or the like.

The transition metal element of the transition element-containing material used as the catalyst in the method of the present invention can include Ti, V, Cr, Mn, Fe, Co, Ni, Cu, Y, Zr, Nb, Mo, Ru, Rh, Pd, Ag, Ta, W, Pt, and Au. Of these, Ni, Co, Fe, Cu, Cr, W, Mo, Ti, V, Mn, Ru, Rh, Pd, and Ag are more preferred, and Ni, Co, Fe, Cu, Cr, W, Mo, and Ti are most preferred.

The transition metal element-containing material may comprise at least one kind of a transition metal selected from the group consisting of transition metals of these transition metal elements or at least one kind of a transition metal compound selected from the group consisting of transition metal compounds of these transition metal elements.

The transition metal compound can include transition metal oxides, transition metal hydroxides, organo transition metal compounds, transition metal sulfides, transition metal carbides, transition metal nitrides, and salts of transition metal elements (hereinafter referred to as transition metal salts).

The organo transition metal compounds mentioned above are preferable, because any one of them can be easily decomposed to form a transition metal fine powder when the starting material is decomposed under the high temperature-high pressure conditions and the transition metal fine powder functions as the catalyst in the synthesis reaction in the method of the present invention, although they are relatively costly.

The above-mentioned transition metal oxides, transition metal hydroxides, and transition metal salts are preferable, because each of them is reduced with hydrogen gas generated when the starting material is decomposed under the high temperature-high pressure conditions, to form a transition metal power, and the transition metal power functions as the catalyst in the synthesis reaction in the method of the present invention.

The above-mentioned transition metal salts are preferable for the reason that any one of them is reduced or oxidized in the synthesis reaction in the method of the present invention and is converted into a transition metal or a transition metal oxide, and the transition metal or the transition metal oxide can be recovered as a transition metal salt by dissolving with an acid. The transition metal salt recovered in this way can be recycled and used as the catalyst in the method of the present invention. However, in the case where the transition metal salt is a transition metal nitrate or a transition metal sulfate, these transition metal salts are liable to generate oxygen. Therefore, it is not preferable to separately use these transition metal salts.

Preferable specific examples of aforesaid organo transition metal compounds include ferrocene, nickelocene, nickel formate, nickel oxalate, nickel naphthenate, nickel phthalocyanine, cobalt phthalocyanine, copper phthalocyanine, nickel acetylacetonato, cobalt acetylacetonato, iron acetylacetonato, copper acetylacetonato, nickel carbonyl, cobalt carbonyl, iron carbonyl, bis(triphenylphosphine)dicarbonylnickel, dibromobis(triphenylphosphine)nickel, and chlorotris(triphenylphosphine)rhodium.

The carbon element contained in these organo transition metal compounds occasionally becomes a part of nano-carbon materials formed in the synthesis reaction in the method of the present invention.

Here, the catalyst used in the method of the present invention includes decomposed products produced in the synthesis reaction in the method of the present invention, which products exhibit a catalytic action.

As previously described, as the catalyst used in the method of the present invention, it is preferred to use a powder catalyst.

In the case where the average diameter of microunits (observed by the electron microscope), which constitute nano-carbon materials produced according to the method of the present invention, depends on the average particle size of the catalyst particles, it is important to properly control the average particle size of the catalyst particles.

In order to obtain nano-carbon materials whose diameters are small and which are substantially uniform with respect to their sizes, it is preferred to adopt (i) a manner in which the catalyst particles are used by being dispersed in a carrier having a large specific surface area so as to be retained on the carrier or (ii) a manner in which, in addition to the catalyst particles, a solvent capable of dissolving these particles is introduced or a surfactant capable of preventing these particles from aggregating is introduced.

In the present invention, in order to better promote the synthesis of nano-carbon materials, it is possible that one or more kinds of materials selected from the group consisting of sulfur and sulfur compounds are made to coexist with the transition metal or the transition metal compound as the transition metal element-containing material serving as the catalyst in the method of the present invention. In this case, the presence of the sulfur or/and the sulfur compound occasionally serves to control the direction in which the nano-carbon materials grow.

The sulfur compound can include a thiol, a thioacetamide, thionaphthene, thiosemicarbazido, thiourea, and thiophene. Of these, a thiol is particularly preferable.

Preferable specific examples of the thiol include 1-octanethiol(n-octylmercaptan), 1-decanethiol (n-decylmercaptan), 1-dodecanethiol (n-dodecylmercaptan), n-butylmercaptan, propylmercaptan, methylmercaptan, ethylmercaptan, benzylmercaptan, and thiophenol.

It is not always necessary for the sulfur or the sulfur compound to be externally added. The sulfur or the sulfur compound may be one originally contained in the starting material. Particularly, some of those materials previously mentioned as the starting material often contain sulfur or/and sulfur compound therein. Such sulfur or/and such sulfur compound contained in the starting material may be used instead of the sulfur or/and the sulfur compound, which is externally added.

The method of the present invention preferably includes a heat-treating step (c). The reaction product obtained in the foregoing step (a) in the first embodiment of the process of the present invention or in the foregoing step (b) in the second embodiment of the process of the present invention contains synthesized nano-carbon materials. The heat-treating step (c) serves to improve the purity of the nano-carbon materials of the reaction product by removing impurities, including amorphous carbons contained therein, and it also serves to further develop the graphene sheet structures of the nano-carbon materials.

It is preferred that the reaction product, prior to being subjected to the heat treatment or the heat-treated reaction, the product obtained in the heat-treating step (c) is washed with an acid or the like to remove the catalyst (the catalyst particles) therefrom. By performing the heat treatment in the heat-treating step (c) at a temperature of more than 1500° C., it is possible to remove the catalyst remaining in the nano-carbon materials by sublimation.

From a viewpoint of efficiently removing aforesaid impurities, including amorphous carbons, and also from a viewpoint of improving the purity of the nano-carbon materials, the heat treatment of the reaction product in the heat-treating step (c) is preferably performed at a temperature in a range of from 400 to 2800° C. Similarly, the heat treatment of the reaction product in the heat-treating step (c) is preferably performed in a gas atmosphere composed of an inert gas. The inert gas can include argon gas, helium gas and nitrogen gas. These gases may be used either singly or in combination of two or more of these gases as a mixed gas.

In order to ensure the removal of the impurities, including amorphous carbons, and in order to ensure the improvement of the purity of the nano-carbon materials, it is preferable to repeat the heat treatment of the reaction product several times by changing the heat-treating temperature, for instance, in such a manner that the reaction product is subjected to a first heat treatment at a temperature on a low end of the above-described temperature region, followed by a second heat treatment at a temperature, which is in the middle to high end of the above-described temperature region.

To be more specific, in order to desirably develop the graphene sheet structures of the nano-carbon materials while ensuring the removal of the impurities, including amorphous carbons, to improve the crystallinity of the nano-carbon materials, it is preferred that the reaction product is subjected to a first heat treatment at a relatively low temperature in a range of from 400 to 800° C., followed by a second heat treatment at a high temperature in a range of from 900 to 2800° C., and it is more preferred that the reaction product is subjected to a first heat treatment at a relatively low temperature in a range of from 400 to 800° C., followed by a second heat treatment at a high temperature in a range of from 1000 to 2200° C.

Separately, the heat treatment of the reaction product at a temperature in a region of from 2200 to 2800° C. is liable to develop the graphite structures (comprising a plurality of graphene sheets stacked) of the nano-carbon materials contained therein.

In the case where the heat treatment of the reaction product is repeated several times in this manner, in order to improve the effect of the heat treatment for the reaction product, it is possible to adopt a manner in which the heat-treated reaction product obtained, for instance, in the first heat treatment is pulverized prior to being subjected to the next heat treatment.

The nano-carbon materials synthesized according to the method of the present invention are somewhat different depending on the related conditions, including the kind of the starting material used, the kind of the catalyst used, the kind of the supplementary material used as the reaction promotion medium to form a supercritical fluid or a subcritical fluid to be contacted with the starting material, and the temperature and the pressure adopted in the synthesis reaction.

However, the nano-carbon materials produced according to the method of the present invention include nano-carbon materials comprising such aggregates as mentioned below, which are identified by a scanning electron microscope (SEM). Particularly, the nano-carbon materials produced according to the method of the present invention typically include nano-carbon materials comprising aggregates of a plurality of filament-like shaped (or worm-like shaped) microunits and nano-carbon materials comprising aggregates of a plurality of tube-like shaped microunits, wherein the microunits in each case have an average diameter in a range of from 4 to 400 nm and an average length in a range of from 100 to 10000 nm. In the method of the present invention, these filament-like (or worm-like) or tube-like nano-carbons are likely to be synthesized at a high purity and at a high yield.

The diameters of these nano-carbon materials are liable to depend on the average particle size of a powder catalyst used as the catalyst in the method of the present invention.

According to observation by a transmission electron microscope (TEM) with respect to aforesaid microunits, the nano-carbon materials produced according to the method of the present invention include (a) nano-carbon materials having a microstructure in which a plurality of graphene sheets shaped in a cup-like or megaphone-like form, which are stacked and developed into a filament-like state, (b) nano-carbon materials having a microstructure in which a graphene sheet is wound in a length-wise direction parallel to a fiber axis into a single-layered tubular form or wound several times in a length-wise direction slant to a fiber axis into a multi-layered tubular form, (c) nano-carbon materials comprising a platelet type graphite nanofiber in which a plurality of graphene sheets are stacked vertically to a fiber axis or a herringbone type graphite nanofiber in which a plurality of graphene sheets are stacked slantingly to a fiber axis, and (d) nano-carbon materials having a microstructure in which a graphene sheet is developed into a sphere form or a disk form.

The nano-carbon materials described in (a) to (c) above have a diameter in a range of from 4 to 400 nm and have a diameter in a range of from 20 to 400 nm in many cases.

In the method of the present invention, filament-like (or worm-like) or tube-like nano-carbons having such microstructure as described in (a) or (b) above are liable to be readily synthesized at a high purity and at a high yield, and the nano-carbons having such a microstructure as described in (a) above are more likely to be synthesized.

In the case where a given transition metal element-containing material is used as the catalyst, it is considered that in many cases, the growth of those nano-carbon materials mentioned above is initiated from the starting point based on the transition metal element-containing material. Therefore, the synthesized nano-carbon materials in many cases contain a transition metal or a transition metal compound resulting from the catalyst at their tip portions. Such a transition metal or transition metal compound can be removed by dissolving it with an acid or the like. In the alternative, such a residual transition metal or transition metal compound can be removed by a heat treatment at a temperature of more than 1500° C.

According to the method of the present invention, it is preferable to carry out a purification step (d) after the heat-treating step (c).

In the case where, for instance, a magnetic transition metal selected from the group consisting of Fe, Ni, and Co or a magnetic transition metal compound whose transition metal element is selected from these magnetic transition metal element is used as the transition metal element-containing catalyst, the resulting nano-carbon materials-containing reaction product contains a magnetic body comprising such a magnetic transition metal element.

The reaction product is heat-treated in the heat-treating step (c) in the manner as previously described. The purification step (d) comprises subjecting the heat-treated reaction product to a purification treatment in which only the magnetic body-containing nano-carbon materials are collected using a magnet, such as a permanent magnet or an electromagnet, to obtain a purified nano-carbon materials-containing product. To be more specific, the heat-treated reaction product is dispersed in a dispersion medium, such as alcohol or water while irradiating an ultrasonic wave. Thereafter, the magnetic body-containing nano-carbon materials are collected by a permanent magnet or an electromagnet, whereby it is possible to obtain a purified nano-carbon materials-containing product.

In the case where the purified nano-carbon materials-containing product still contains a residue resulting from the foregoing transition metal or transition metal compound, it is possible to adopt a further purification step in which the product is treated with an acid (such as nitric acid, hydrochloric acid, sulfuric acid, or hydrofluoric acid) or an alkali (such as sodium hydroxide or potassium hydroxide) to dissolve and remove the residue, and the product thus treated is washed and dried. By this, it is possible to obtain a definitely purified nano-carbon materials-containing product.

Separately, the purification step (d) may be performed in the following manner. In the case where the nano-carbon materials-containing product, having been heat-treated in the heat-treating step (c), contains a transition metal or a transition metal compound resulting from the catalyst, the product is treated with an acid (such as nitric acid, hydrochloric acid, sulfuric acid, or hydrofluoric acid) or an alkali (such as sodium hydroxide or potassium hydroxide) to dissolve and remove the transition metal or the transition metal compound contained in the nano-carbon materials-containing product, and the product thus treated is washed and dried. By this, it is possible to obtain a purified nano-carbon materials-containing product, which contains neither the transition metal nor the transition metal compound.

However, there is an occasion when it is preferable for the nano-carbon materials obtained to contain a residue resulting from the catalyst in their microunits or in their tip portions, depending on the use of the product. In this case, the purification using the acid or the alkali need not be performed. However, in the case where the nano-carbon materials are used in an application in which a residue contained in the nano-carbon materials is liable to provide adverse effects, it is preferred that the purification is performed.

Separately, in both the purification using the magnet and the purification using the acid or the alkali, in order to improve the efficiency of the purification, when the nano-carbon materials-containing product is pulverized by a mill prior to the purification treatment, intertwined aggregates of nano-carbons can be unraveled, further improving purification efficiency.

FIG. 1 shows a flow chart illustrating an example of the above-described method of the present invention. FIG. 2 is a schematic diagram illustrating an example of a reaction apparatus used for practicing the method of the present invention.

A description will be provided with reference to FIG. 1.

In Step 1, a given starting material, a given catalyst, and if necessary, a given reaction promotion medium (comprising a supplementary material capable of functioning to promote the reaction of said starting material) and given inert gas are introduced into a substantially enclosed reaction vessel (which is deoxidized) of a reaction apparatus.

In Step 2, the materials introduced in the reaction vessel are together heat-treated for a prescribed period of time at a temperature in a range of from 100° C. to 800° C. while being compressed at a pressure in a range of from 0.2 MPa to 60 MPa, whereby the starting material and/or the reaction promotion medium is converted into a supercritical fluid or a subcritical fluid and the starting material is reacted to obtain a reaction product containing nano-carbon materials, followed by removing unreacted starting material contained in the reaction product to obtain a nano-carbon product in Step 3.

In Step 4, the nano-carbon product obtained in Step 3 is subjected to a heat treatment at a temperature of 400° C. to 2800° C., preferably in an inert gas atmosphere mainly in order to remove impurities (including amorphous carbons) contained in the nano-carbon product. If necessary, the heat-treated nano-carbon product is subjected to a purification treatment to remove the residual catalyst contained therein.

However, depending on the use of the nano-carbon product, it is not always necessary to perform Step 3 or Step 4.

The reaction apparatus shown in FIG. 2 comprises a substantially enclosed pressure reaction vessel 200 provided with a heater 203, a pressure gauge 206, a safety vent 207, and an agitation mechanism 211. Reference numeral 201 indicates a starting material and/or a reaction promotion medium introduced in the reaction vessel 200, and reference numeral 202 indicates a catalyst. The reaction vessel 200 is provided with a supply pipe 209, which is connected to a starting material reservoir 204 and a reaction promotion medium reservoir 205 through valves, as shown in FIG. 2. The reaction vessel 200 is also provided with an exhaust pipe 210, which is connected to a vacuum pump 208 through a valve, as shown in FIG. 2.

At least the inner wall of the reaction vessel 200 is made of, preferably, a stainless steel or, more preferably, a Ni—Mo alloy so as to have sufficient corrosion resistance.

Although not shown in FIG. 2, the reaction apparatus preferably has a circulating flow reaction system so that a nano-carbon materials-containing reaction product is separated from the reaction product containing nano-carbon materials and unreacted starting material, which are outputted from the reaction vessel, and the unreacted starting material is returned into the reaction vessel, in order to improve the yield from the starting material.

The production of a nano-carbon product using the reaction apparatus shown in FIG. 2 is performed, for instance, as will be described below.

A given catalyst 202 is introduced in the reaction vessel 200 and the inside of the reaction vessel 200 is evacuated to deoxidize through the exhaust pipe 210 by actuating the vacuum pump 208. Then, a prescribed amount of a given starting material from the starting material reservoir 204 is introduced in the reaction vessel 200 through the supply pipe 209. At this time, if necessary, a prescribed amount of a given reaction promotion medium, such as carbon dioxide or the like, from the reaction promotion medium reservoir 205 is also introduced in the reaction vessel 200 through the supply pipe 209. The materials (the catalyst, the starting material, and the reaction promotion medium) in the reaction vessel 200 are subjected to a heat treatment at a prescribed temperature (which exceeds the critical point where the starting material or the reaction promotion medium is converted into a supercritical fluid or a subcritical fluid) by actuating the heater 203 while being compressed at a prescribed pressure and while agitating the materials by the agitation mechanism 211, so that the starting material 201 is uniformly contacted with the catalyst 202, whereby nano-carbon materials are synthesized from the starting material.

FIG. 3 is a schematic diagram illustrating an example of a reaction apparatus for continuously producing nano-carbon materials in accordance with the method of the present invention. In FIG. 3, reference numeral 300 indicates a substantially enclosed pressure reaction vessel provided with a supply means for supplying a starting material 304 into the reaction vessel 300, a supply means for supplying a catalyst 305 into the reaction vessel 300, and a supply means for supplying a reaction promotion medium 306 into the reaction 300. The reaction promotion medium 306 is supplied, if required. Reference numeral 301 indicates a separator for separating a product (a nano-carbon product). Reference numeral 302 indicates a recovery and purification tower for recovering and purifying a starting material. Reference numeral 303 indicates a compressor, and reference numeral 307 indicates a nano-carbon product outputted from the separator 301, collected in a receiving vessel.

The continuous production of nano-carbon materials in the apparatus shown in FIG. 3 is performed, for instance, as will be described below.

After the inside of the reaction vessel 300 is sufficiently deoxidized, a given starting material 304 and a given catalyst 305, and if necessary, a given reaction promotion medium 306 are introduced into the reaction vessel 300, the materials (the starting material 304, the catalyst 305 and the reaction promotion medium 306) in the reaction vessel 300 are subjected to a heat treatment at a prescribed temperature (which exceeds the critical point where the starting material or the reaction promotion medium is converted into a supercritical fluid or a subcritical fluid) while being compressed at a prescribed pressure and while agitating said materials, so that the starting material 304 is uniformly contacted with the catalyst 305, whereby nano-carbon materials are synthesized from the starting material. A mixture comprising a nano-carbon materials-containing product and unreacted starting material, which is outputted from the reaction vessel 300, is transported into the separator 301, where the nano-carbon materials-containing product (307) is separated from the unreacted starting material (304). The nano-carbon materials-containing product 307 is sent to the receiving vessel. The unreacted starting material (304), which is outputted from the reaction vessel 300, is transported into the recovery and purification tower 302, where the unreacted starting material (304) is purified into a pure starting material 304, which is transported into the reaction vessel 300 through the compressor 303. Following this, the above procedures for synthesizing nano-carbon materials are repeated to produce a nano-carbon materials-containing product, which is collected in the receiving vessel.

The formation of a nano-carbon material synthesized by the method of the present invention can be identified by observing via a scanning electron microscope (SEM), and the microstructure of the nano-carbon material can be identified by observing via a transmission electron microscope (TEM).

The proportion of an amorphous component contained in the nano-carbon material may be analyzed by X-ray diffraction analysis or laser Raman spectroscopy. In the case where a synthesized nano-carbon material contains a carbon nanotube, in the Raman spectrum of this carbon nanotube, there are observed a Raman line at a position in the vicinity of 1528 to 1606 $cm^{-1}$ and a Raman line at a position in the vicinity of 1353 $cm^{-1}$. In the X-ray diffraction analysis, there is observed a sharp diffraction peak when the nano-carbon material is of a high purity. When the nano-carbon material contains a large amount of amorphous carbon, there is observed a broad diffraction peak. In the Raman spectrum for this case, there is observed a large peak at a position in the vicinity of 1353 $cm^{-1}$.

Consequently, the purity of a synthesized nano-carbon material can be evaluated mainly by identifying the form thereof by using the SEM. It can be also evaluated on the basis of the observed result by using the TEM, the half band width of an X-ray diffraction peak, or the ratio of a peak intensity at a position in the vicinity of 1353 $cm^{-1}$ to that at a position in the vicinity of 1528 to 1606 $cm^{-1}$ in the Raman spectrum.

Separately, an evaluation with respect to the performance of a nano-carbon materials-containing product obtained in the present invention, when it is used as an anode material for a rechargeable lithium battery, may be performed, for instance, in the following manner. A cell is prepared by arranging a working electrode comprising the nano-carbon materials-containing product and a counter electrode comprising a lithium metal in an electrolyte solution comprising a lithium salt as an electrolyte dissolved in a nonaqueous solvent such that the working electrode and the counter electrode are opposed to each other. Then, lithium is electrochemically inserted in the working electrode and the lithium is electrochemically released from the working electrode, where the quantity of electric current flown upon the insertion of the lithium is compared with that upon the release of the lithium. When both the former quantity and the latter quantity are large and a difference between the former quantity and the latter quantity is small, being close to zero, it means that the performance of the nano-carbon materials-containing product as the anode material for a rechargeable lithium battery is excellent.

An evaluation with respect to the performance of a nano-carbon materials-containing product obtained in the present invention, when it is used as a cathode for a field emission display (FED), may be performed, for instance, in the following manner. A prescribed electric field is applied between a cathode comprising the nano-carbon materials-containing product and an anode as the counter electrode to the cathode under reduced pressure, where the value of an electric current flown per unit area of the cathode is measured.

When the electric current value is large, it means that the nano-carbon materials-containing product is excellent in terms of performance as the cathode for the FED.

An evaluation with respect to the ability of a nano-carbon materials-containing product obtained in the present invention to store hydrogen therein may be performed, for instance, in the following manner. The nano-carbon materials-containing product is maintained in a hydrogen gas under low temperature to let the hydrogen gas permeate into the nano-carbon materials-containing product. Thereafter, the nano-carbon materials-containing product is heated to release hydrogen from the product, where the amount of the permeated hydrogen and the amount of the released hydrogen are measured. Based on the measured results, the stored hydrogen amount per unit weight of the product is computed. When this amount is large, it means that the nano-carbon materials-containing product has sufficient hydrogen storage ability.

In order to evaluate the performance of a nano-carbon materials-containing product obtained in the present invention, when it is used in a catalyst-retaining layer of Pt or the like in a fuel cell, the specific surface area and the electron conductivity of the nano-carbon materials-containing product are important factors. Therefore, the specific surface area and the electron conductivity are measured. Also, the average particle size of catalyst particles of Pt or the like, which are retained in the nano-carbon materials-containing product, and the power output characteristics of a fuel cell in which a catalyst-retaining layer comprising the nano-carbon materials-containing product having catalyst particles of Pt or the like retained therein is used are evaluated. In this case, it is better for the specific surface area to be high, the resistivity to be small, and the average particle size of the catalyst particles, which are retained, to be small. When the resistivity is small, the electron conductivity is increased and the electrode resistance is decreased, and as a result, the power outputted is increased.

A nano-carbon materials-containing product obtained in the present invention can be desirably used, for instance, as an electrode material of a rechargeable lithium battery, as a cathode material of a FED, and as a catalyst-retaining layer of a fuel cell.

The use of a nano-carbon materials-containing product (hereinafter simply referred to as "nano-carbon material") obtained in the present invention in the above-mentioned applications will be described in the following.

Rechargeable Lithium Battery:

In the case where the nano-carbon material is used in a rechargeable lithium battery (here, this includes a rechargeable lithium ion battery), it is preferred to be used as an anode material to store and release a lithium ion, as an electrically conductive auxiliary for an anode material, or as an electrically conductive auxiliary for a cathode to store and release a lithium ion.

FIG. 4 is a schematic cross-sectional view illustrating the constitution of an example of a rechargeable lithium battery. In FIG. 4, reference numeral 401 indicates an anode, reference numeral 402 an ion conductor, reference numeral 403 a cathode, reference numeral 404 an anode terminal, reference numeral 405 a cathode terminal, and reference numeral 406 a battery housing.

Figure 5:
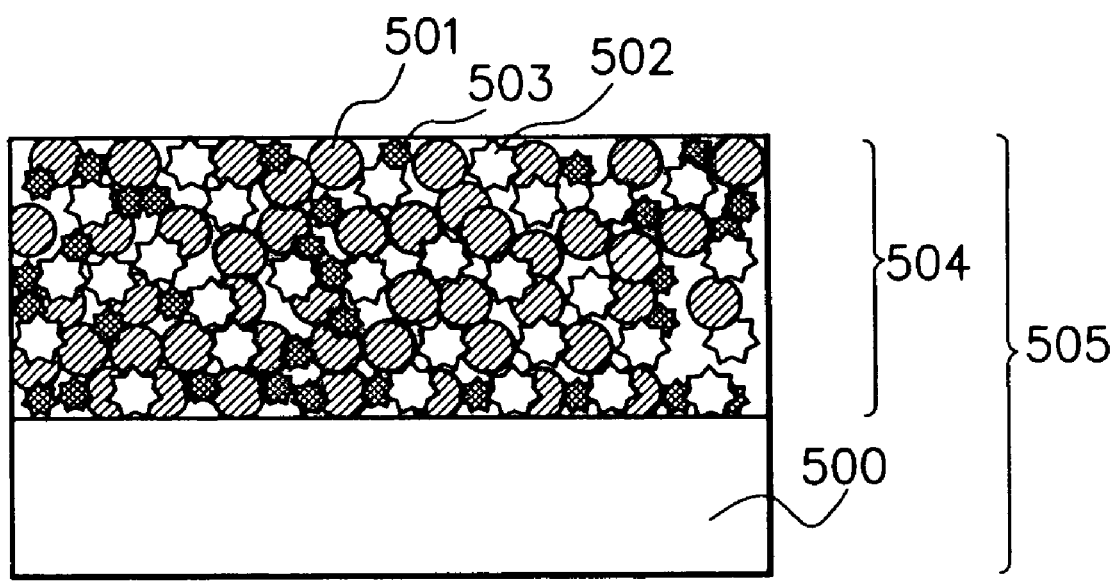
FIG. 5 is a schematic cross-sectional view illustrating an example of an electrode structural body for a rechargeable lithium battery, wherein said electrode structural body is formed using a nano-carbon material obtained according to the method of the present invention.

The anode 401 in the rechargeable lithium battery shown in FIG. 4 comprises an electrode structural body 505 shown in FIG. 5.

In the electrode structural body shown in FIG. 5, the nano-carbon material is used in the anode material, which functions to store and release the lithium ion.

In FIG. 5, reference numeral 500 indicates a collector, reference numeral 501 a nano-carbon material in a powdery form (obtained in the present invention), reference numeral 502 a binder, reference numeral 503 an electrically conductive auxiliary, and reference numeral 504 an active material layer.

In another electrode structural body (as an anode), in the case where instead of the nano-carbon material 501, Si, Sn or an alloy thereof is used in the anode material to store and release the lithium ion, it is possible to use a nano-carbon material obtained in the present invention as the electrically conductive auxiliary 503, because the nano-carbon material has a small average particle size and is highly electrically conductive.

The electrode structural body 505 shown in FIG. 5 may be prepared, for instance, in the following manner.

A binder 502 comprising an organic polymer is admixed with aforesaid nano-carbon material 501, and if necessary, an electrically conductive auxiliary 503 and a solvent are added, to obtain a mixture. The mixture is disposed on a collector 500 comprising a copper foil or the like to form an active material layer 504 on the collector 500, whereby an electrode structural body 505 is obtained.

The resultant electrode structural body 505 is used as the anode 401 in the rechargeable lithium battery shown in FIG. 4.

As aforesaid organic polymer used as the binder 502, it is possible to use a fluororesin, such as polyvinylidene fluoride or the like, or a water-soluble organic polymer, such as polyvinyl alcohol or the like.

As the cathode 403 in the rechargeable lithium battery shown in FIG. 4, it is possible to use an electrode structural body prepared, for instance, in the following manner. A powder of a lithium-transition metal oxide, a lithium-transition metal phosphate, or a lithium-transition metal sulfate, an electrically conductive auxiliary comprising a graphite powder or the like, a binder comprising an organic polymer, and a solvent are mixed to obtain a mixture. The mixture is disposed on a collector comprising an aluminum foil or the like to form a cathode active material layer on the collector, whereby an electrode structural body is obtained. The resultant electrode structural body is used as the cathode 403. The transition metal element of the lithium-transition metal oxide, the lithium-transition metal phosphate or the lithium-transition metal sulfate which is used as the cathode active material, may be Co, Ni, Mn, or Fe. Similarly, as the organic polymer used as the binder, it is possible to use a fluororesin, such as polyvinylidene fluoride or the like, or a water-soluble organic polymer, such as polyvinyl alcohol or the like.

As the above-described electrically conductive auxiliary, it is possible to use a nano-carbon material obtained in the present invention, because the nano-carbon material has a small average particle size and is highly electrically conductive. The electrode structural body as the cathode 403 in this case has the same constitution as the electrode structural body shown in FIG. 5, except that 501 comprises a lithium-transition metal oxide or the like and the electrically conductive auxiliary 503 comprises the nano-carbon material.

As the ion conductor 402 arranged between the anode 401 and the cathode 403 in the rechargeable lithium battery shown in FIG. 4, it is possible to use a separator comprising a microporous polyolefin series film formed of polyethylene or polypropylene having an electrolyte retained therein.

The electrolyte may be an electrolyte solution obtained by dissolving a lithium salt selected from the group consisting of lithium salts of $Li^+$ (lithium ion) with Lewis acid ions such as $BF_4^-$, $PF_6^-$, $AsF_6^-$, $ClO_4^-$, $CF_3SO_3^-$, $N(CF_3SO_2)_2^-$, or $BPh_4^-$ (with Ph being a phenyl group) in an organic solvent, such as ethylene carbonate, propylene carbonate, dimethyl carbonate, or diethyl carbonate, or a gelated electrolyte obtain by gelating the electrolyte solution by adding an organic polymer thereto.

Figure 6:
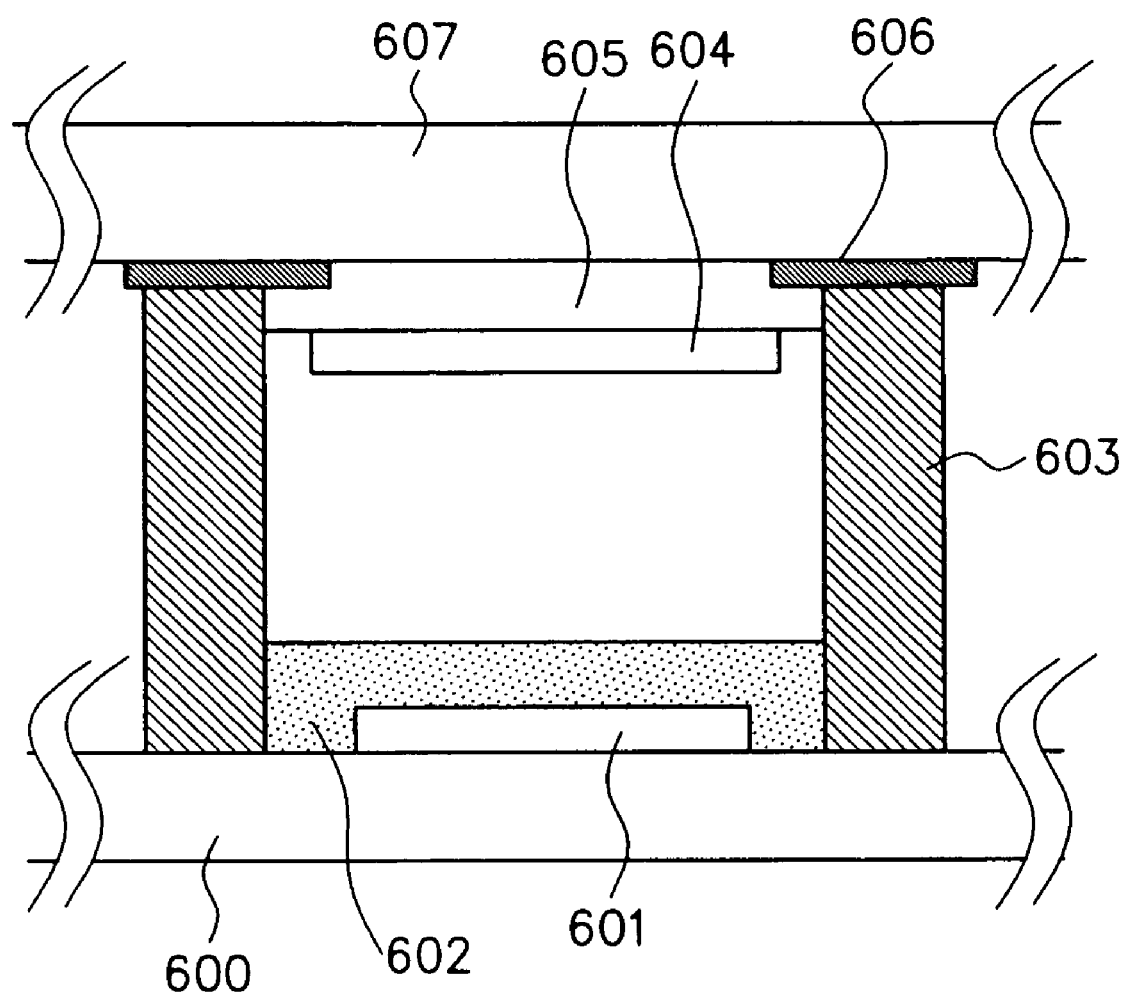
FIG. 6 is a schematic cross-sectional view illustrating an example of a FED in which a nano-carbon material obtained according to the method of the present invention is applied.

FED (Field Emission Display):

FIG. 6 is a schematic cross-sectional view illustrating the constitution of an example of a FED.

In FIG. 6, reference numeral 600 indicates an insulating plate (a glass plate), reference numeral 601 a back electrode (a cathode), reference numeral 602 a cathode layer formed using a nano-carbon material (obtained in the present invention), reference numeral 603 an insulating spacer (a barrier wall), reference numeral 604 a fluorescent substance layer, reference numeral 605 a transparent electrode (an anode), reference numeral 606 a surface mask, and reference numeral 607 a transparent surface member (comprising a glass plate).

The FED shown in FIG. 6 may be prepared, for instance, in the following manner. A metal electrode pattern 601 is arranged on a glass plate 600. On the metal electrode pattern 601, a paste obtained by mixing aforesaid nano-carbon material with a binder to obtain a mixture and adding a solvent to the mixture is coated by screen-printing or the like, followed by drying and baking to form a cathode layer 602. A transparent electrode pattern 605 is formed on a glass plate 607, and a fluorescent substance layer 604 is formed on the transparent electrode pattern 605 by screen-printing or the like. The transparent electrode 605 (the anode) and the cathode layer 602 are opposed to each other, and a spacer 603 (a barrier wall) is arranged between the transparent electrode 605 and the cathode layer 602. After the inside space of the system is evacuated to a prescribed vacuum, the system is closed. In this manner, the FED shown in FIG. 6 may be prepared.

The I-V characteristics with respect to field emission from a nano-carbon material obtained in the present invention may be evaluated, for instance, in the following manner.

FIG. 7 is a schematic cross-sectional view illustrating the structural composition of an example of an element used for evaluating the field emission performance of the nano-carbon material. In FIG. 7, reference numeral 700 indicates an insulating substrate, reference numeral 701 a cathode pattern, reference numeral 702 a cathode layer formed using the nano-carbon material, reference numeral 703 an insulating spacer, reference numeral 704 an anode, reference numeral 705 a cathode lead, and reference numeral 706 an anode lead.

The element shown in FIG. 7 is placed in a vacuum chamber provided with a current introduction terminal, where the I-V characteristics with respect to field emission from the nano-carbon material may be evaluated by applying a prescribed voltage between the anode 704 and the cathode 702 (comprising the nano-carbon material) and measuring the value of an electric current flowing between the cathode 702 and the anode 704.

The element shown in FIG. 7 may be prepared, for instance, in the following manner. A mask having a cathode pattern with an electrode-drawing portion formed by etching is close-contacted onto a sodium-free glass substrate 700 (comprising, for instance, a No. 7059 glass plate produced by Corning Company), and thereafter, a 50 nm thick Cr film, a 300 nm thick Al film and a 50 nm thick Cr film are sequentially deposited by electron beam evaporation or the like to form a cathode pattern 701. Then, a nano-carbon material obtained in the present invention is dispersed in isopropyl alcohol while irradiating an ultrasonic wave, and the cathode pattern and a counter electrode are immersed in the dispersion, where a D.C. electric field is applied between the cathode pattern 701 and the counter electrode to deposit the nano-carbon material on the cathode pattern 701 to form a cathode layer 702. Successively, an insulating member comprising mica and having a thickness in a range of from about 20 to 200 μm as the insulating spacer 703 is fixed on the cathode layer 702, and thereon, an aluminum plate as the anode 704 is fixed. Thereafter, a cathode lead 705 is connected with the Cr/Al/Cr film as the cathode pattern 701, and an anode lead 706 is connected to the aluminum plate as the anode 704. In this manner, the element shown in FIG. 7 may be prepared.

The evaluation of the I-V characteristics with respect to field emission of the nano-carbon material by using the element shown in FIG. 7 may be performed in the following manner. The element is placed in a vacuum chamber, which is provided with a current introduction terminal and which is preferably maintained at a vacuum of less than 10-3 Pa, where a prescribed voltage is applied between the anode lead 706 and the cathode lead 705 and the value of an electric current flowing between the cathode 702 and the anode 704 is measured. Based on the interrelation between the values of the electric current and the values of the voltage applied, the I-V characteristics of the nano-carbon material are evaluated.

Figure 8:
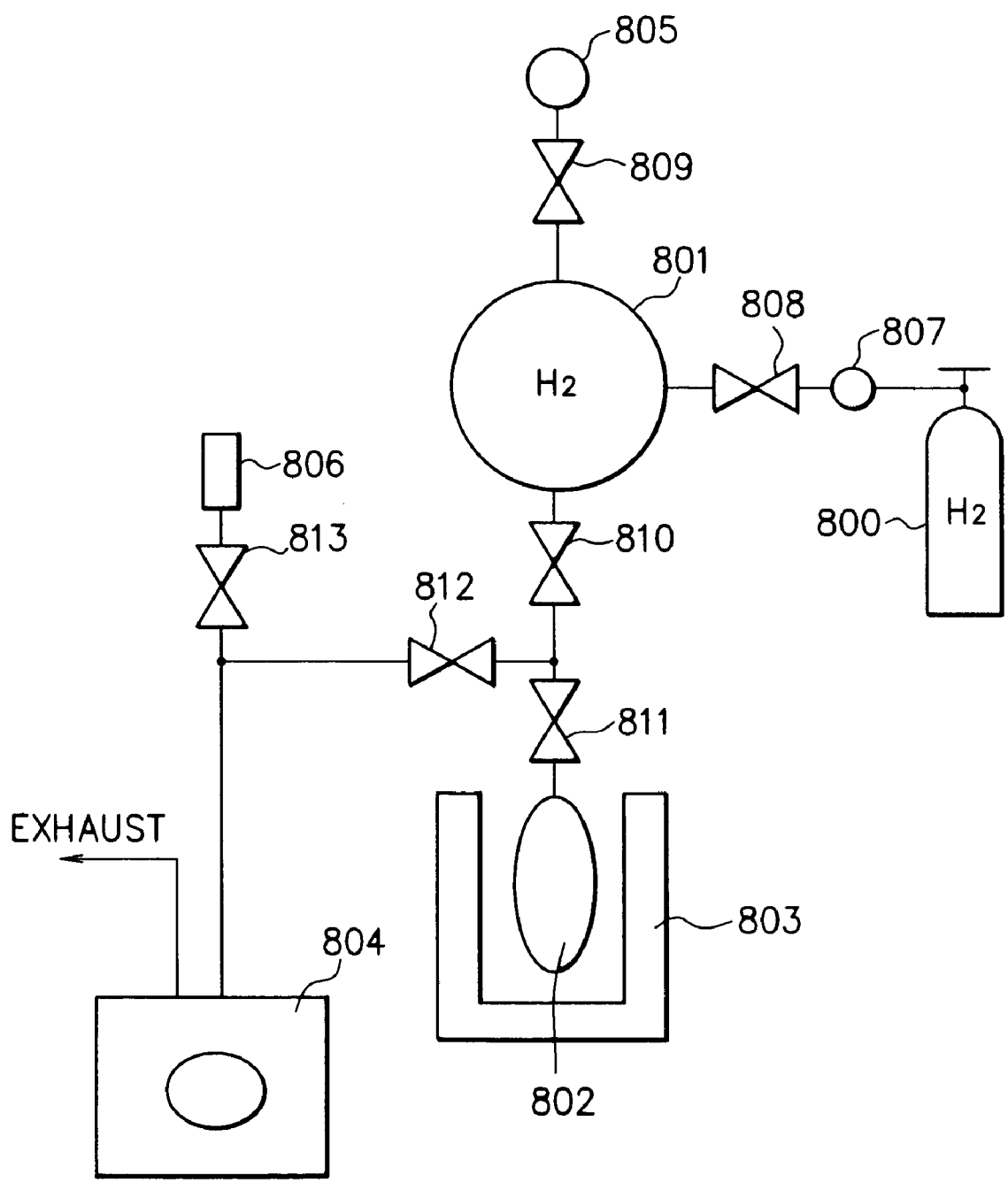
FIG. 8 is a schematic diagram illustrating an example of an apparatus for examining the hydrogen-storing performance of a nano-carbon material.

Hydrogen Storage Material:

The hydrogen-storing performance of a nano-carbon material produced in the present invention may be evaluated by using an appropriate measuring apparatus, as shown in FIG. 8. The measuring apparatus shown in FIG. 8 has a container with a prescribed volume in which the nano-carbon material is charged and a vessel in which hydrogen is stored, wherein the container and the vessel are connected through a switching valve.

In FIG. 8, reference numeral 800 indicates a high pressure hydrogen gas cylinder, reference numeral 801 a vessel in which hydrogen is stored, reference numeral 802 a container in which the nano-carbon material is charged, reference numeral 803 a temperature controller, reference numeral 804 a vacuum pump, reference numeral 805 a pressure gage, reference numeral 806 a vacuum gage, reference numeral 807 a pressure regulation valve, and each of reference numerals 808, 809, 810, 811, 812, and 813 a switching valve.

The vacuum gage 806 is connected to the container 802 through the switching valves 811, 812 and 813. The vacuum pump 804 is connected to the container 802 through the switching valves 811 and 812. The pressure gage 805 is connected to the vessel 801 through the switching valve 809. The hydrogen gas cylinder 800 is connected to the vessel 801 through the switching valve 808 and the pressure regulating valve 807.

The evaluation of the hydrogen-storing performance of the nano-carbon material by using the measuring apparatus shown in FIG. 8 may be performed, for instance, in the following manner.

A nano-carbon material obtained in the present invention, which material has been sufficiently dried, is provided. The weight of the nano-carbon material is measured, and the nano-carbon material as an object to be measured is inserted in the container 802. The inside of the container 802 is evacuated to a high degree of vacuum by the vacuum pump 804, and hydrogen gas from the vessel 801, whose inside pressure is maintained at a prescribed pressure, is introduced into the container 802 by opening the switching valves 810 and 811. After a prescribed period of time has elapsed, the hydrogen gas pressure in the container 802 and that in the vessel 801 are measured.

From the initial hydrogen gas pressure in the vessel 801, the volume of the vessel 801 and that of the container 802, it is possible to compute the amount of hydrogen stored in the nano-carbon material per unit weight of the nano-carbon material. However, in practice, while changing the pressure of the hydrogen gas introduced into the container 802, the stored amount of hydrogen and the released hydrogen amount, respectively, when the hydrogen gas pressure in the container 802 is equilibrated are measured. Based on the measured results, the stored amount of hydrogen per unit weight of the nano-carbon material is computed.

In the following, the present invention will be described in more detail with reference to examples. It should be understood that these examples are only for illustrative purposes and the scope of the present invention is not restricted by these examples.

EXAMPLE 1

After the pressure reaction vessel made of a Hastelloy (trademark name: comprising a Ni—Mo alloy, produced by Haynes International Inc.) with an inner volume of 95 ml of the reaction apparatus shown in FIG. 2 was evacuated to a prescribed vacuum by the vacuum pump, 2.5 g of n-hexane (the critical temperature: 234.4° C.; the critical pressure: 2.97 MPa) as the starting material and 0.2 g of a nickelocene (bis(cyclopentadienyl)nickel) as the catalyst were introduced into the reaction vessel, followed by adding thereto 30$g$ of dry ice as the reaction promotion medium. The reaction vessel was closed, where the dry ice evaporated to form $CO_2$ gas at room temperature. Therefore, a part of said $CO_2$ gas was exhausted outside the reaction vessel to adjust the inner pressure of the reaction vessel to a desired value. The materials in the reaction vessel were subjected to a reaction at a temperature of 650° C. while being compressed at a pressure of 23 MPa and while being agitated by the agitation mechanism for 2 hours, followed by being cooled to room temperature. Then, the reaction vessel was opened to take out a solid component, and the solid component was dried to obtain 0.54 g of a reaction product in a powder form, that is, a powdery nano-carbon product [this will be referred to hereinafter as "nano-carbon product (a)"].

A part of the nano-carbon product (a) was subjected to a heat treatment at a temperature of 1500° C. in an argon gas atmosphere to obtain a powdery nano-carbon product (b). A part of the nano-carbon product (b) was subjected to a heat treatment at a temperature of 2800° C. in an argon gas atmosphere to obtain a powdery nano-carbon product (c).

Evaluation

Each of the nano-carbon product (a), the nano-carbon product (b) and the nano-carbon product (c) was evaluated by a scanning electron microscope (SEM) and a transmission electron microscope (TEM). In addition, each of them was evaluated by X-ray microanalysis, X-ray diffraction analysis and Raman spectroscopic analysis.

1. In the SEM observation of the nano-carbon product (a), there was obtained a SEM image shown in FIG. 9, showing that substantially 100% of the SEM image comprised a significantly large number of filament-like shaped microunits, which were gathered. It was found that these filament-like shaped microunits have a diameter in a range of from about 10 nm to 100 nm, and they mostly have a length of less than about 4 µm, but include longer microunits whose length is more than 4 µm. It was also found that the filament-like microunits include ones whose outer diameter is about 87 um and whose inner diameter (the diameter of a hollow portion) is about 30 nm.

In the X-ray microanalysis of the nano-carbon product (a), the presence of a residual nickel metal (resulting from the catalyst) at tips of the filament-like microunits was observed, but the presence of material other than carbon was not observed. In the X-ray diffraction analysis of the nano-carbon product (a), there were observed a diffraction peak based on graphite carbon and a diffraction peak based on nickel metal. From the results in the X-ray microanalysis and the X-ray diffraction analysis, it is considered that the nickelocene used as the catalyst decomposed into nickel metal during the reaction.

In the Raman spectroscopic analysis of the nano-carbon product (a), there were observed a relatively strong peak, which is a so-called G-band, near 1590 cm$^{-1}$ and a relatively weak peak, which is a so-called D-band, near 1350 cm$^{-1}$. That is, for the relative peak intensity between the G-band peak near 1590 cm$^{-1}$ and the D-band peak near 1350 cm$^{-1}$, it was found that the intensity of the former is stronger.

Figure 10:
FIG. 10 shows a TEM (transmission electron microscope) image (observed at a low magnification) of a nano-carbon material produced according to the method of the present invention in Example 1, which will be described later.

In the TEM observation of the nano-carbon product (a), there were obtained a TEM image (observed at a low magnification) shown in FIG. 10 and a TEM image (observed at a high magnification) shown in FIG. 11.

Figure 12:
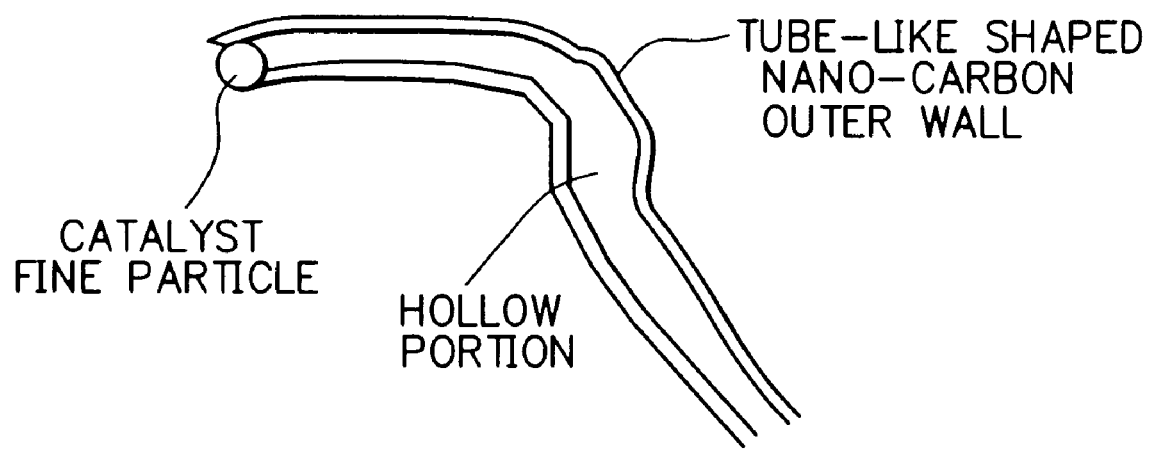
FIG. 12 is a schematic view illustrating a conjectured unit structure of an example of a filament-like nano-carbon material produced according to the method of the present invention.

From FIG. 9 and FIG. 10, and also from the results in the X-ray microanalysis and the X-ray diffraction analysis, it is understood that the nano-carbon product (a) comprises nano-carbon materials having a hollow tubular structure grown from the surface of a nickel metal fine particle as schematically shown in FIG. 12.

Figure 13A:
FIGS. 13(a) to 13(e) are schematic views respectively illustrating a microstructure inferred from a TEM image of a nano-carbon material produced according to the method of the present invention.
Figure 13B:
Figure 13C:
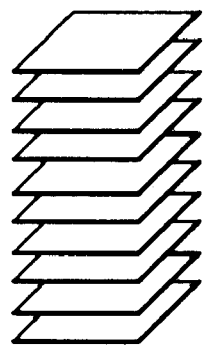
Figure 13D:
Figure 13E:
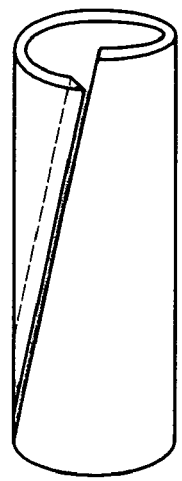

FIGS. 13(a) to 13(e) are schematic views respectively illustrating a microstructure inferred from a TEM image of a filament-like nano-carbon material. Particularly, FIG. 13(a) shows a microstructure in which a plurality of graphene sheets developed into a megaphone-like form are stacked and developed into a tubular form. FIG. 13(b) shows a microstructure in which a plurality of graphene sheets respectively developed into a cup-like form are stacked and developed into a pillar form. FIG. 13(c) shows a microstructure in which a plurality of graphene sheets are stacked vertically to a fiber axis and developed into a pillar form. FIG. 13(d) shows a microstructure in which a number of graphene sheets are stacked on a concentric circle parallel to a fiber axis and developed into a tubular form. FIG. 13(e) shows a microstructure in which a number of graphene sheets are piled, concentrically wound while rotating in a fiber axis direction and developed into a tubular form.

From the TEM image shown in FIG. 11, it is considered that the nano-carbon product (a) would include filament-like nano-carbon materials having such a microstructure as shown in FIG. 13(a) or FIG. 13(e). In the TEM observation of a different sample of the nano-carbon product (a), there was observed a microstructure approximate to the microstructure shown in FIG. 13(b), and there was also observed another microstructure likely similar to the microstructure shown in FIG. 13(d).

2. For the nano-carbon product (b) [after having been baked at 1500° C.] and the nano-carbon product (c) [after having been baked at 2800° C.], it was found that such a microstructure as shown in FIG. 9, in which a significantly large number of filament-like microunits are gathered, is maintained in each of them.

In the Raman spectroscopic analysis of each of the nano-carbon product (b) and the nano-carbon product (c), there was observed substantially no distinct peak near 1350 cm$^{-1}$. This means that the peak of 1350 cm$^{-1}$, which was observed in the case of the nano-carbon product (a), substantially disappeared due to baking.

3. The foregoing procedures for the production of the nano-carbon product (a) were repeated to obtain a powdery nano-carbon product (a'). The nano-carbon product (a') was subjected to a heat treatment at a temperature of 1500° C. in an argon gas atmosphere to obtain a powdery nano-carbon product (b'). The nano-carbon product (b') was treated with hydrochloric acid then treated with nitric acid to elute and remove the residual nickel metal therein. The nano-carbon product (b') thus treated washed with ion-exchanged water and heat-treated at a temperature of 350° C. in an air atmosphere, followed by being ground by means of a ball mill, to obtain a Ni-free nano-carbon powder [this will be hereinafter referred to as "nano-carbon powder (i)"].

A part of the nano-carbon powder (i) was subjected to an evaluation of the I-V characteristics with respect to field emission in the following manner.

An element having a structure such as shown in FIG. 7 was prepared in accordance with the previously described method for the preparation of the element shown in FIG. 7, except for the following points. That is, the nano-carbon powder (i) was dispersed in isopropyl alcohol while irradiating an ultrasonic wave. A cathode pattern formed of a stainless steel plate and a counter electrode was immersed in the dispersion, where a D.C. electric field was applied between the cathode pattern and the counter electrode to form a nano-carbon material layer as the cathode layer on the cathode pattern by cataphoresis. A 150 µm thick insulating member comprising mica as the insulating spacer was fixed on the cathode layer, and thereon, an aluminum plate as the anode was fixed. In this way, there was prepared an element having a structure shown in FIG. 7.

The element thus prepared was placed in a vacuum chamber, which is provided with a current introduction terminal and which is maintained at a vacuum of less than 10-3 Pa, where a prescribed electric field was impressed to the element to measure I-V characteristics with respect to field emission. As a result, the nano-carbon powder (i) was found to have a threshold voltage of less than 5V/µm and an electron emission current value, which is about 10 times greater than that of a commercially available carbon multi-nanotube material (produced by The Honjo Chemical Corporation).

4. An electrode structural body having a configuration such as shown in FIG. 5 was prepared in accordance with the previously described method for preparing an electrode structural body shown in FIG. 5, except that the remaining part of the nano-carbon powder (i) obtained above in Section 3 was used as the nano-carbon material 501. This electrode structural body was evaluated with respect to insertion-release performance of the lithium ion in the following manner.

A separator was interposed between the electrode structural body and a counter electrode comprising lithium metal, which are arranged such that they are opposed to each other, with the separator comprising a microporous polyethylene film and being incorporated with an electrolyte solution obtained by dissolving 1 mol/l of lithium tetrafluoroborate (LiBF4) in a mixed solvent composed of ethylene carbonate and diethyl carbonate at a mixing ratio of 3:7. Using this, an electrochemical insertion and release of a lithium ion was performed. As a result, a quantity of the lithium ion, which is 1.2 times that in the case of using an electrode formed of a natural graphite, could be stored in the electrode structural body. This indicates that in the case where a rechargeable lithium battery having a configuration such as shown in FIG. 4 is fabricated using the aforesaid electrode structural body as the anode, the resulting rechargeable lithium battery would have a greater capacity than that of a rechargeable battery fabricated using an electrode formed of a natural graphite as the anode.

5. The nano-carbon product (a) was subjected to an evaluation with respect to the hydrogen-storing ability thereof in accordance with the previously described evaluation method using the measuring apparatus shown in FIG. 8. As a result, the nano-carbon product (a) was found to have a hydrogen-storing ability, which is substantially the same as that of a commercially available multi-walled carbon nanotube.

EXAMPLE 2

In this example, there were provided two substantially enclosed pressure reaction vessels made of a Hastelloy (trademark name: comprising a Ni—Mo alloy, produced by Haynes International Inc.) with an inner volume of 95 ml as the pressure reaction vessel (200) of the reaction apparatus shown in FIG. 2. Separately using these two reaction vessels, the procedures of Example 1 for the production of the nano-carbon product (a) were repeated, except that the reaction temperature and the reaction pressure were changed to 450° C. and 14 MPa, respectively, and the reaction time was changed to 6 hours, to separately obtain a powdery nano-carbon product (i) in an amount of 0.40 g in one reaction vessel and a powdery nano-carbon product (ii) in an amount of 0.82 g in another reaction vessel. In this case, the oxygen content and the moisture content in the two reaction vessels were not precisely controlled so as to be substantially the same upon introducing the starting material, the catalyst and dry ice therein.

Now, it is considered that the history of the reaction vessel and the oxygen content and/or the moisture content in the system would have influenced this difference in terms of the yield. Separately, because the valence number of the constituent nickel of the nickelocene as the catalyst is liable to change depending on the preservation state of the nickelocene in an air atmosphere, it is also considered that the nickelocene would have been influenced by oxygen or moisture and this would have become a factor to differentiate the yield.

In the SEM observation of each of the nano-carbon product (i) and the nano-carbon product (ii), there was obtained a SEM image in which a substantially large number of filament-like shaped (or worm-like shaped) microunits are gathered. It was also found that the filament-like shaped microunits have a diameter in a range of from about 20 nm to 30 nm. In the TEM observation of each of the nano-carbon product (i) and the nano-carbon product (ii), there was observed a microstructure approximate to the microstructure shown in FIG. 13(*b*).

EXAMPLE 3

The procedures of Example 1 for the production of the nano-carbon product (a) were repeated, except that the reaction temperature was changed to 450° C., the reaction time was changed to 6 hours, the reaction pressure was changed to a prescribed pressure value in a range of from 14 to 16 MPa (see, Table 1). Also, instead of the nickelocene as the catalyst, a nickel fine powder, a cobalt fine powder, a nickel-retained silica powder, a nickel-retained alumina powder, a nickel-retained alumina powder, a palladium-retained alumina powder, and a nickel oxide powder were separately used, to obtain a powdery nano-carbon product for each of these catalysts.

The results of the SEM observation revealed that each of the nano-carbon products contained a substantially large number of filament-like shaped nano-carbon microunits, which were gathered.

The reaction pressure, the yield of the nano-carbon product, the amount of the catalyst used, and the diameter of the microunits in the nano-carbon product in each case where the aforesaid nickel fine powder, aforesaid cobalt fine powder, aforesaid nickel-retained silica powder, or aforesaid nickel oxide powder was used are collectively shown in Table 1. Only in the case of the cobalt fine powder, the amount used was 1 g.

Here, the nickel fine powder used in this example comprises particles having a particle size in a range of from 0.5 to 1.0 μm and a specific surface area in a range of from 1.5 to 2.5 m²/g.

The nickel-retained silica powder used in this example retains the nickel in a amount of 70 wt. %, has a primary particle size in a range of from 0.01 to 0.02 μm and a secondary particle size of about 20 μm, and has a specific surface area in a range of from 30 to 40 m²/g.

The nickel-retained alumina powder used in this example has a primary particle size of from 0.1 μm and a secondary particle size in a range of from 5 to 10 μm. The palladium-retained alumina powder used in this example has a primary particle size of 0.01 μm and a secondary particle size in a range of from 20 to 30 μm.

Based on the results shown in Table 1, it was found that in the case where the nickel-retained silica powder whose nickel (transition metal) particles are considered to be the smallest among other catalyst particles used, a nano-carbon material containing filament-like shaped nano-carbon microunits with the smallest diameter was formed.

In the case of the nano-carbon product synthesized in the presence of the nickel oxide as the catalyst, it was found that the filament-like shaped nano-carbon microunits contained therein has a filament length, which is relatively short. In this case, the result of the X-ray diffraction analysis revealed that the nickel oxide was reduced into a metallic nickel during the reaction. This indicates that the atmosphere during the reaction became a reducing atmosphere. It is considered that such a reducing atmosphere is composed of hydrogen gas or carbon monoxide. It is considered that hydrogen gas would be generated when the starting material is decomposed. It is considered that carbon monoxide is probably generated due to the reaction of hydrogen gas with carbon dioxide or due to the reaction of the stating material with residual oxygen in the reaction vessel. Further, it is possible that carbon monoxide will become a raw material for a nano-carbon material synthesized in the reaction vessel.

Separately, it was recognized that filament-like shaped nano-carbon microunits grown from nickel particles having a relatively large particle size have a relatively large diameter of about 100 µm and have a microstructure approximate to the microstructure shown in FIG. 13(c).

EXAMPLE 4

The procedures of Example 1 for the production of the nano-carbon product (a) were repeated, except that instead of the nickelocene as the catalyst, an iron fine powder was used, to obtain a nano-carbon product. The nano-carbon product obtained in this example was found to contain filament-like shaped nano-carbon microunits, which are similar to those in Example 1.

Separately, the above procedures were repeated by changing the reaction temperature to 450° C. In this case, a desired nano-carbon product was not obtained. The results of the X-ray diffraction analysis revealed that the iron of the iron fine powder as the catalyst was converted into iron oxide.

EXAMPLE 5

The procedures of Example 1 for the production of the nano-carbon product (a) were repeated, except that the reaction temperature was changed to 450° C., the reaction time was changed to 6 hours, the reaction pressure was changed to a prescribed pressure value in a range of from 9.3 to 30.1 MPa (see, Table 2), and instead of n-hexane as the starting material, n-pentane, n-heptane, n-octane, n-nanone, n-decane, hexadecane, 2,2,4-trimethylpentane, cyclohexane, 1-hexene, and n-octene were separately used, to obtain a powdery nano-carbon product for each of these hydrocarbons.

The results of the SEM observation revealed that each of the nano-carbon products contained a significantly large number of filament-like shaped nano-carbon microunits, which were gathered.

The starting material, the reaction pressure, the yield of the nano-carbon product, and the diameter of the microunits in the nano-carbon product in each case are collectively shown in Table 2.

EXAMPLE 6

The procedures of Example 1 for the production of the nano-carbon product (a) were repeated, except that the reaction temperature was changed to 450° C., the reaction pressure was changed to about 10 MPa, the reaction time was changed to 6 hours, and instead of the n-hexane as the starting material, ethanol, 1-butanol, and hexanol were separately used, to obtain a powdery nano-carbon product for each of these materials as the starting material.

The results of the SEM observation revealed that each of the nano-carbon products obtained contained a significantly large number of filament-like shaped nano-carbon microunits, which were gathered.

The starting material, the reaction pressure, the yield of the nano-carbon product, and the diameter of the microunits in the nano-carbon product in each case are collectively shown in Table 3.

As the results shown in Table 3 illustrate, it is understood that a nano-carbon product was obtained from 1-butanol at a yield, which is similar to that in the case of using n-hexane.

EXAMPLE 7

The procedures of Example 1 for the production of the nano-carbon product (a) were repeated, except that the reaction temperature was changed to 450° C., the reaction pressure was changed to 20.9 MPa, the reaction time was changed to 6 hours, and instead of the nickelocene as the catalyst, a catalyst prepared as will be described in the following was used, to obtain a powdery nano-carbon product.

The results of the SEM observation revealed that the nano-carbon product obtained contains a number of spherical-shaped nano-carbons having a diameter in a range of from 1 to 3 µm, which are gathered. This is different from the nano-carbon products obtained in other examples.

The catalyst used in this example was prepared as will be described below.

(1) 7.08 of cetyltriacetylammoniumbromide as a surfactant was added to 63.72 g of toluene and heated to 70° C. to dissolve the surfactant in the toluene. Then, 0.1 g of nickel chloride ($NiCl_2 \cdot 6H_2O$) was added and dissolved therein to obtain a solution.

(2) An aqueous solution of $NaBH_4$ (obtained by dissolving 0.0476 g of $NaBH_4$ in 2.5 g of deionized water) was subjected to a reaction by a drop-wise addition to the solution obtained in the above step (1) while stirring the solution by a homogenizer to obtain a suspension.

(3) The suspension obtained in the above step (2) was subjected to centrifugation, washed using toluene and acetone, subjected to centrifugation. The solvent was removed, followed by drying to obtain a catalyst used in this example.

EXAMPLE 8

1. The procedures of Example 1 for the production of the nano-carbon product (a) were repeated, except that the reaction temperature was changed to 450° C., the reaction pressure was changed to 2.4 MPa, the reaction time was changed to 6 hours, and instead of dry ice as the reaction promotion medium, liquid nitrogen was used, to obtain a powdery nano-carbon product in an amount of 0.01 g.

Although the yield of the nano-carbon product was small, the results of the SEM observation revealed that the nano-carbon product contained a significantly large number of filament-like shaped nano-carbon microunits, which were gathered.

2. The procedures of Example 1 for the production of the nano-carbon product (a) were repeated, except that the reaction temperature was changed to 450° C., the reaction pressure was changed to 7.5 MPa, the reaction time was changed to 6 hours, and instead of dry ice as the reaction promotion medium, argon gas was used, to obtain a powdery nano-carbon product in a small amount. However, the results of the SEM observation revealed that the nano-carbon product contained a significantly large number of filament-like shaped nano-carbon microunits, which were gathered.

3. The procedures of Example 1 for the production of the nano-carbon product (a) were repeated, except that the reaction temperature was changed to 450° C., the reaction pressure was changed to 9.5 MPa, and the reaction time was changed to 6 hours, to obtain a powdery nano-carbon product in an amount of 0.51. The results of the SEM observation revealed that the nano-carbon product contained a significantly large number of filament-like shaped nano-carbon microunits, which were gathered.

From the results in the above three cases 1 to 3, the following facts are understood. (1) Even when the reaction pressure is about 2 MPa, a desired nano-carbon is synthesized. (2) From a viewpoint of producing a nano-carbon product at a high yield, as the reaction promotion medium, carbon dioxide is more preferable than nitrogen gas or argon gas. Further, the results in the above three cases 1 to 3 indicate that carbon dioxide functions as a medium to promote the synthesis reaction to synthesize a nano-carbon material, and the results suggest a possibility that carbon dioxide contributes to the formation of a reducing atmosphere generated during the reaction and functions as a raw material for a nano-carbon material synthesized in the reaction vessel.

EXAMPLE 9

1. Into the pressure reaction vessel made of a Hastelloy (trademark name: comprising a Ni—Mo alloy, produced by Haynes International Inc.) with an inner volume of 95 ml of the reaction apparatus shown in FIG. 2, 0.2 g of a silica powder having nickel particles in an amount of 70 wt. % retained therein was introduced as the catalyst. After this, the reaction vessel was evacuated to a prescribed vacuum by the vacuum pump, followed by introducing into the reaction vessel 7.26 g of n-hexane as the starting material and 11.26 g of carbon dioxide as the reaction promotion medium. The materials (the starting material, the catalyst and the reaction promotion medium) in the reaction vessel were subjected to a reaction by heating them at 450° C. while being compressed at a pressure of 19.0 MPa and while agitating by means of the agitation mechanism for 6 hours, followed by being cooled to room temperature. Then, the reaction vessel was opened to take out a solid component, and the solid component was dried to obtain a powdery nano-carbon product in an amount of 2.36 g.

2. The procedures in the above part 1 for the production of the nano-carbon product were repeated, except that instead of the n-hexane as the starting material, methane, ethane, propane, ethylene, and propylene were separately used, and the reaction pressure was changed to a prescribed pressure value in a range of from 9.15 to 11.04 (see, Table 4), to obtain a nano-carbon product for each of the hydrocarbons.

The results of the SEM observation revealed that each of the nano-carbon products obtained in the above two cases 1 and 2 contained a significantly large number of filament-like shaped nano-carbon microunits, which were gathered. It was found that the filament-like shaped nano-carbon microunits have a diameter in a range of from 20 to 80 nm in the case where ethylene or propylene was used as the starting material.

The amount of the starting material used, the amount of the carbon dioxide used, the reaction pressure, and the yield of the nano-carbon product in each case are collectively shown in Table 4.

As Table 4 illustrates, it is understood that of n-hexane, ethylene and propylene used as the starting material, propylene has the highest conversion efficiency into a nano-carbon material, ethylene has the second highest conversion efficiency, and n-hexane has the third highest conversion efficiency. Particularly, in the production method of the present invention, it is considered that unsaturated hydrocarbons are more liable to convert into a nano-carbon material having filament-like shaped microunits.

Separately, the nickel-retained silica powder used as the catalyst in this example is more stable compared to the nickelocene, and it is hardly influenced by residual oxygen in the reaction vessel, being different from the nickelocene. Therefore, it is considered that a difference in terms of the yield such as described in Example 2 would not have occurred in this Example.

EXAMPLE 10

Into the pressure reaction vessel made of a Hastelloy (Ni—Co alloy) with an inner volume of 95 ml of the reaction apparatus shown in FIG. 2, 0.2 g of ferrocene as the catalyst was introduced. After this, the reaction vessel was evacuated to a prescribed vacuum by the vacuum pump, followed by introducing into the reaction vessel 7.92 g of n-hexane as the starting material, and the reaction vessel was closed. Then, the materials (n-hexane and ferrocene) in the reaction vessel were subjected to a reaction by heating at 800° C. while being compressed at a pressure of 2.1 MPa and while being agitated by the agitation mechanism for 2 hours, followed by being cooled to room temperature. Then, the reaction vessel was opened to take out a solid component, and the solid component was dried to obtain a powdery nano-carbon product in an amount of 0.314 g.

In the TEM observation of the resultant nano-carbon product, there was obtained a TEM image shown in FIG. 14. Based on the TEM image shown in FIG. 14, it was found that the nano-carbon product has a microstructure in which a number of graphene sheets containing iron catalyst fine particles are stacked, which is similar to the microstructure shown in FIG. 13($d$).

EXAMPLE 11

Into the pressure reaction vessel made of a Hastelloy (Ni—Co alloy) with an inner volume of 95 ml of the reaction apparatus shown in FIG. 2, 0.2 g of a ferrocene as the catalyst was introduced. After this, the reaction vessel was evacuated to a prescribed vacuum by the vacuum pump, followed by introducing 3.89 g of methane as the starting material into the reaction vessel, and the reaction vessel was closed. Then the materials (the starting material and the catalyst) in the reaction vessel were subjected to a reaction by heating at 800° C. while being compressed at a pressure of 12.9 MPa and while being agitated by the agitation mechanism for 10 minutes, followed by being cooled to room temperature. Then, the reaction vessel was opened to take out a solid component, and the solid component was dried to obtain a powdery nano-carbon product in an amount of 0.447 g.

In the SEM observation of the resultant nano-carbon product, there was obtained a SEM image shown in FIG. 15. Based on the SEM image shown in FIG. 15, it was found that the nano-carbon product contained a significantly large number of filament-like shaped nano-carbon microunits having a diameter in a range of from 20 nm to 100 nm and a length in a range of from 30 to 100 μm, which were gathered. Separately, the results of the TEM observation revealed that the nano-carbon product had a carbon nanotube microstructure comprising a multi-walled tube.

The nano-carbon product obtained in this example was subjected to an evaluation of the I-V characteristics with respect to field emission in the following manner.

An element having a structure such as shown in FIG. 7 was prepared in accordance with the previously described method for the preparation of the element shown in FIG. 7, except for the following points. That is, the nano-carbon product was ground by a ball mill to obtain a nano-carbon fine powder. The nano-carbon fine powder was dispersed in isopropyl alcohol while being irradiated with an ultrasonic wave to obtain a dispersion. A cathode pattern and a counter electrode were immersed in the dispersion, where a D.C. electric field was applied between the cathode pattern and the counter electrode to form a nano-carbon material layer as the cathode layer on the cathode pattern by way of cataphoresis. A 150 μm thick insulating member comprising mica as the insulating spacer was fixed on the cathode layer, and thereon, an aluminum plate as the anode was fixed. In this manner, an element having a structure such as shown in FIG. 7 was prepared.

The element thus prepared was placed in a vacuum chamber, which is provided with a current introduction terminal and which is maintained at a vacuum of less than 10-3 Pa, where a prescribed electric field was applied to the element to measure I-V characteristics with respect to field emission. As a result, the nano-carbon product obtained in this example was found to have a threshold voltage of less than 2 V/μm and an electron emission current value, which is about 30 times greater than that of a commercially available carbon multinanotube material (produced by The Honjo Chemical Corporation).

EXAMPLE 12

Into the pressure reaction vessel made of a Hastelloy (Ni—Co alloy) with an inner volume of 95 ml of the reaction apparatus shown in FIG. 2, 0.2 g of ferrocene as the catalyst was introduced. After this, the reaction vessel was evacuated to a prescribed vacuum by the vacuum pump, followed by introducing 9.34 g of propylene as the starting material into the reaction vessel, and the reaction vessel was closed. Then, the materials (the starting material and the catalyst) in the reaction vessel were subjected to a reaction by heating at 800° C. while being compressed at a pressure of 2.2 MPa and while being agitated by the agitation mechanism for 5 minutes, followed by being cooled to room temperature. Then, the reaction vessel was opened to take out a solid component, and the solid component was dried to obtain a powdery nano-carbon product in an amount of 0.443 g.

Figure 16:
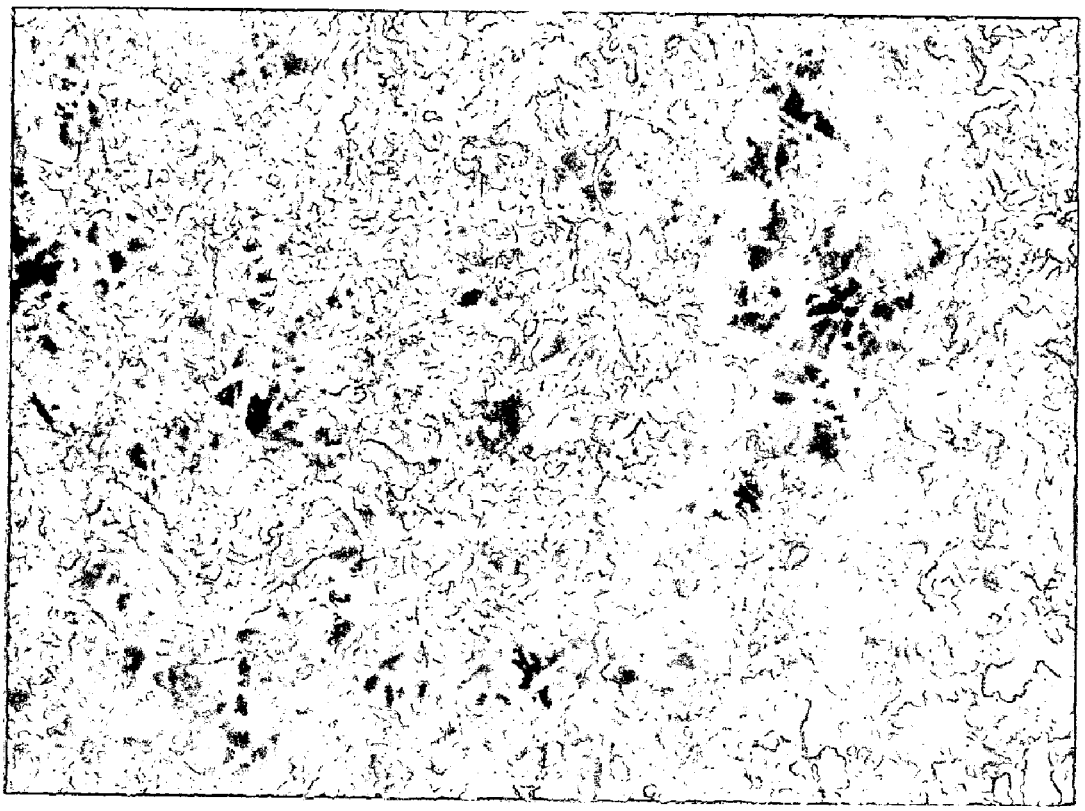
FIG. 16 shows a SEM image of a nano-carbon material produced by the method of the present invention in Example 12, which will be described later.

In the SEM observation of the resultant nano-carbon product, there was obtained a SEM image shown in FIG. 16. Based on the SEM image shown in FIG. 16, it was found that the nano-carbon product contained a significantly large number of filament-like shaped nano-carbon microunits having a diameter of less than 40 nm, which were gathered. Separately, the results of the TEM observation revealed that the nano-carbon product had a carbon nanotube microstructure comprising a multi-walled tube.

EXAMPLE 13

Into the pressure reaction vessel made of a Hastelloy (Ni—Co alloy) with an inner volume of 95 ml of the reaction apparatus shown in FIG. 2, 0.2 g of ferrocene as the catalyst was introduced. After this, the reaction vessel was evacuated to a prescribed vacuum by the vacuum pump, followed by introducing into the reaction vessel 3.89 g of methane as the starting material and 5.99 g of nitrogen ($N_2$) as the reaction promotion medium, and the reaction vessel was closed. Then, the materials (the starting material, the catalyst and the reaction promotion medium) in the reaction vessel were subjected to a reaction by heating at 800° C. while being compressed at a pressure of 16.0 MPa and while being agitated by the agitation mechanism for 10 minutes, followed by being cooled to room temperature. Then, the reaction vessel was opened to take out a solid component, and the solid component was dried to obtain a powdery nano-carbon product in an amount, which is 1.3 times that of the nano-carbon product in Example 11.

The results in the SEM observation of the resultant nano-carbon product revealed that the nano-carbon product obtained in this example contained a significantly large number of filament-like shaped nano-carbon microunits having an average diameter of about 100 nm, which were gathered. Here, in comparing the nano-carbon microunits in this example with the nano-carbon microunits in Example 11, the diameter of the former was found to be greater than that of the latter, the distribution uniformity of the former was found to be superior to that of the latter, and the length of the former was found to be shorter than that of the latter.

COMPARATIVE EXAMPLE 1

The procedures of Example 1 for the production of the nano-carbon product (a) were repeated, except for changing the reaction temperature to 90° C. and the reaction pressure to 15 MPa. In this case, a desired powdery nano-carbon as in Example 1 could not be produced.

COMPARATIVE EXAMPLE 2

The procedures of Example 1 for the production of the nano-carbon product (a) were repeated, except for changing the reaction pressure to 1 MPa. In this case, a desired powdery nano-carbon as in Example 1 could not be produced.

COMPARATIVE EXAMPLE 3

The procedures of Example 1 for the production of the nano-carbon product (a) were repeated, except for not introducing nickelocene as the catalyst into the reaction vessel. In this case, a desired powdery nano-carbon as in Example 1 could not be produced.

COMPARATIVE EXAMPLE 4

The procedures of Example 1 for the production of the nano-carbon product (a) were repeated, except for changing n-hexane as the starting material to methanol. In this case, a desired powdery nano-carbon as in Example 1 could not be produced.

TABLE 1

| samples in Example 3 | catalyst | amount of catalyst (g) | pressure (MPa) | yield (g) | diameter of nano-carbon microunit (nm) |
|---|---|---|---|---|---|
| A | Ni | 0.2 | 14.7 | 0.86 | 20~100 |
| B | Co | 1.0 | 17.5 | 1.35 | 26~53 |
| C | Ni/$SiO_2$ | 0.2 | 16.6 | 0.56 | 7~27 |
| D | NiO | 0.2 | 15.7 | 0.718 | 20~30 |

TABLE 2

| samples in Example 5 | starting material | pressure (MPa) | yield (g) | diameter of nano-carbon microunit (nm) |
|---|---|---|---|---|
| A | n-pentane | 30.1 | 0.187 | not measured |
| B | n-heptane | 23.7 | 0.45 | not measured |
| C | n-octane | 14.3 | 0.44 | not measured |
| D | n-nonane | 17.3 | 0.47 | 15–20 |
| E | n-decane | 14.6 | 0.69 | not measured |
| F | hexadecane | 15.4 | 0.53 | 15~30 |
| G | 2,2,4-trimethylpentane | 14.8 | 0.52 | not measured |
| H | cyclohexane | 9.3 | 0.24 | 20~30 |
| I | 1-hexene | 17.9 | 0.57 | not measured |
| J | n-octene | 18.2 | 0.69 | not measured |

TABLE 3

| samples in Example 6 | starting material | pressure (MPa) | yield (g) | diameter of nano-carbon microunit (nm) |
|---|---|---|---|---|
| A | ethanol | 12.5 | 0.04 | not measured |
| B | 1-butanol | 11.6 | 0.49 | 15~30 |
| C | hexanol | 15.9 | 0.01 | not measured |

TABLE 4

| samples in Example 9 | starting material | amount of starting material | amount of $CO_2$ | pressure (MPa) | yield (g) |
|---|---|---|---|---|---|
| A | n-hexane | 7.26 | 11.26 | 19.0 | 2.36 |
| B | methane | 4.67 | 10.61 | 21.7 | 0.32 |
| C | ethane | 7.25 | 10.84 | 26.1 | 1.33 |
| D | propane | 7.16 | 9.15 | 22.1 | 2.08 |
| E | ethylene | 6.5 | 10.46 | 19.5 | 2.59 |
| F | propylene | 9.35 | 11.04 | 25.7 | 4.40 |

What is claimed is:

1. A method for producing nano-carbon materials, characterized in that said method includes a step wherein (i) a starting material comprising one or more kinds of compounds selected from the group consisting of saturated hydrocarbons, unsaturated hydrocarbons, saturated cyclic hydrocarbons, and alcohols whose atomic ratio of the component carbon to the component oxygen is more than 2.0 and (ii) a catalyst comprising one or more kinds of materials selected from the group consisting of transition metal element-containing materials, alumina, silica, and silicon carbides are together treated at a temperature in a range of from 100 to 800° C. while being compressed at a pressure in a range of from 0.2 to 60 MPa, where said starting material is converted into a supercritical fluid or a subcritical fluid while said supercritical fluid or said subcritical fluid being contacted with said catalyst, thereby to obtain a reaction product containing nano-carbon materials.

2. A method for producing nano-carbon materials, characterized in that said method includes a step wherein (i) a starting material comprising one or more kinds of compounds selected from the group consisting of saturated hydrocarbons, unsaturated hydrocarbons, saturated cyclic hydrocarbons, and alcohols whose atomic ratio of the component carbon to the component oxygen is more than 2.0, (ii) a catalyst comprising one or more kinds of materials selected from the group consisting of transition metal element-containing materials, alumina, silica, and silicon carbides and (iii) a supplementary material capable of functioning as a reaction promotion medium are together treated at a temperature in a range of from 100 to 800° C. while being compressed at a pressure in a range of from 0.2 to 60 MPa, where at least said supplementary material is converted into a supercritical fluid or a subcritical fluid and said starting material is contacted with said supercritical fluid or said subcritical fluid formed from said supplementary material while being contacted with said catalyst, thereby to obtain a reaction product containing nano-carbon materials.

3. The method according to claim 2, wherein said supplementary material is at least one kind of a material selected from the group consisting of a solvent to dissolve said starting material, a solvent to dissolve the catalyst, water, helium gas, argon gas, nitrogen gas, hydrogen gas, carbon monoxide, nitrous oxide, and ammonia.

4. The method according to claim 1, wherein at least one kind of a material selected from the group consisting of a solvent to dissolve said starting material, a solvent to dissolve the catalyst, water, helium gas, argon gas, nitrogen gas, hydrogen gas, carbon monoxide, nitrous oxide, and ammonia is added to contact with said supercritical fluid or said subcritical fluid formed from said starting material.

5. The method according to claim 3 or 4, wherein said solvent to dissolve said starting material is at least one kind of a material selected from the group consisting of carbon dioxide, aromatic hydrocarbons, and ethers.

6. The method according to claim 1 or 2, wherein said pressure is in a range of from 2 to 40 MPa.

7. The method according to claim 1 or 2, wherein said temperature is in a range of from 200 to 650° C.

8. The method according to claim 1 or 2, wherein said starting material has a dielectric constant in a range of from 1.5 to 25.0 at 25° C.

9. The method according to claim 1 or 2, wherein said transition metal element-containing material is at least one material selected from the group consisting of transition metals and transition metal compounds.

10. The method according to claim 9, wherein said transition metal compound is selected from the group consisting of transition metal sulfides, transition metal carbides, organo transition metal compounds, transition metal nitrides, transition metal oxides, and transition metal salts.

11. The method according to claim 9, wherein said transition metal or said transition metal compound comprises one or more transition metal elements selected from the group consisting of Ni, Co, Fe, Cu, Ag, Cr, W, Mo, Ti, Ru, Rh, and Pd.

12. The method according to claim 1, wherein a surfactant is made to be present together with said catalyst.

13. The method according to claim 1 or 2, which further includes a step wherein said reaction product containing nano-carbon materials is heat-treated at a temperature in a range of from 400 to 2800° C.

14. The method according to claim 13, wherein the heat treatment is performed at a temperature in a range of from 600 to 2200° C.

15. The method according to claim 13, wherein said reaction product containing nano-carbon materials is heat-treated at a temperature in a range of from 400 to 900° C., followed by being heat-treated at a temperature in a range of from 900 to 2800° C.

16. The method according to claim 13, wherein the heat treatment is performed in a gaseous atmosphere composed of one or more gases selected from the group consisting of argon gas, helium gas and nitrogen gas.

17. The method according to claim 1 or 2, wherein said nano-carbon materials contained in the reaction product comprise a plurality of microunits shaped in a filament form (or a worm form), a tubular form or a form comprising a combination of these forms.

18. The method according to claim 17, wherein said plurality of microunits have a diameter in a range of from 4 to 400 nm.

19. The method according to claim 18, wherein said plurality of microunits comprise an aggregate comprising a plurality of microunits having an average diameter in a range of from 4 to 400 nm which are gathered.

20. The method according to claim 17, wherein said plurality of microunits have a length in a range of from 100 nm to 100 µm.

21. The method according to claim 17, wherein said plurality of microunits have a transition element therein or at their tip portion.

22. The method according to claim 21, wherein said plurality of microunits have a transition metal, a transition metal oxide, a transition metal carbide, or a transition metal sulfide therein or at their tip portion.

23. The method according to claim 17, wherein said nano-carbon materials which comprise said plurality of microunits have a microstructure having a hollow tubular structure in that a plurality of graphene sheets wound slantingly to a fiber axis into a megaphone-like form are stacked into a tubular form or a graphene sheet is wound singly or in multiple in a direction parallel to a fiber axis into a cylindrical form.

24. The method according to claim 17, wherein said nano-carbon materials which comprise said plurality of microunits have a microstructure comprising a platelet graphite nanofiber in which a plurality of graphene sheets are stacked vertically to a fiber axis or a herring-bone type graphite nanofiber in which a plurality of graphene sheets are stacked slantingly to a fiber axis, or have a microstructure in that a plurality of graphene sheets shaped in a cup are stacked into a filament state.

25. The method according to claim 1 or 2, wherein said starting material is in the liquid state or in the gaseous state in an environment with normal temperature and normal pressure.

* * * * *

UNITED STATES PATENT AND TRADEMARK OFFICE
CERTIFICATE OF CORRECTION

| | |
|---|---|
| PATENT NO. | : 7,270,795 B2 |
| APPLICATION NO. | : 10/762343 |
| DATED | : September 18, 2007 |
| INVENTOR(S) | : Soichiro Kawakami et al. |

It is certified that error appears in the above-identified patent and that said Letters Patent is hereby corrected as shown below:

ON THE TITLE PAGE [56] REFERENCES CITED:

Other Publications, after "Mingwang Shao et al.,": "4 Carbon" should read --40 Carbon-- and "Selichiro Matsumoto et al.," should read --Seiichiro Matsumoto et al.,--.

SHEET 12:

Fig. 12, "TUBE-LIKE SHAPED" should read --TUBE SHAPED--.

COLUMN 2:

Line 43, "method" should read --methods--.

COLUMN 3:

Line 66, "saturated" should read --of saturated--.

COLUMN 4:

Line 15, "saturated" should read --of saturated--.

COLUMN 6:

Line 15, "depending" should read --depending on--; and
    Line 61, "flow chart" should read --flowchart--.

COLUMN 7:

Line 65, "saturated" should read --of saturated--.

UNITED STATES PATENT AND TRADEMARK OFFICE
CERTIFICATE OF CORRECTION

PATENT NO. : 7,270,795 B2
APPLICATION NO. : 10/762343
DATED : September 18, 2007
INVENTOR(S) : Soichiro Kawakami et al.

It is certified that error appears in the above-identified patent and that said Letters Patent is hereby corrected as shown below:

COLUMN 8:

Line 14, "saturated" should read --of saturated--.

COLUMN 13:

Line 49, "mutually" should read --from mutually--.

COLUMN 14:

Line 21, "power" should read --powder--; and
Line 37, "used" should read --use--.

COLUMN 15:

Line 14, "metal power," should read --metal powder,-- and "power functions" should read --powder functions--.

COLUMN 18:

Line 33, "element" should read --elements--.

COLUMN 24:

Line 22, "obtain" should read --obtained--.

COLUMN 28:

Line 32, "washed" should read --was washed--; and
Line 58, "10-3 Pa," should read --$10^{-3}$ Pa,--.

UNITED STATES PATENT AND TRADEMARK OFFICE
CERTIFICATE OF CORRECTION

PATENT NO. : 7,270,795 B2
APPLICATION NO. : 10/762343
DATED : September 18, 2007
INVENTOR(S) : Soichiro Kawakami et al.

It is certified that error appears in the above-identified patent and that said Letters Patent is hereby corrected as shown below:

<u>COLUMN 35</u>:

Line 21, "10-3 Pa," should read --$10^{-3}$ Pa,--.

<u>COLUMN 40</u>:

Line 3, "megaphone-like" should read --megaphone--; and
Line 14, "cup" should read --cup form--.

Signed and Sealed this

Seventeenth Day of March, 2009

JOHN DOLL
*Acting Director of the United States Patent and Trademark Office*